United States Patent
Tamura et al.

(10) Patent No.: US 7,636,818 B2
(45) Date of Patent: Dec. 22, 2009

(54) STORAGE VIRTUALIZATION SYSTEM AND METHOD

(75) Inventors: Keishi Tamura, Fujisawa (JP); Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 498 days.

(21) Appl. No.: 11/492,097

(22) Filed: Jul. 25, 2006

(65) Prior Publication Data
US 2007/0288700 A1    Dec. 13, 2007

(30) Foreign Application Priority Data
Jun. 8, 2006    (JP)    .............................. 2006-160008

(51) Int. Cl.
G06F 12/00    (2006.01)
(52) U.S. Cl. ...................... 711/150; 711/147
(58) Field of Classification Search .................. None
See application file for complete search history.

(56) References Cited

U.S. PATENT DOCUMENTS

| | | | | |
|---|---|---|---|---|
| 7,441,095 | B2 * | 10/2008 | Tamura et al. .............. | 711/203 |
| 2003/0204597 | A1 * | 10/2003 | Arakawa et al. ............ | 709/226 |
| 2005/0071559 | A1 | 3/2005 | Tamura et al. | |
| 2006/0026346 | A1 | 2/2006 | Kadoiri et al. | |

FOREIGN PATENT DOCUMENTS

| | | |
|---|---|---|
| JP | 2005-107645 | 4/2005 |
| JP | 2006-40026 | 2/2006 |

OTHER PUBLICATIONS

U.S. Appl. No. 11/140,926

* cited by examiner

*Primary Examiner*—Reginald G Bragdon
*Assistant Examiner*—Thanh D Vo
(74) *Attorney, Agent, or Firm*—Brundidge & Stanger, P.C.

(57) ABSTRACT

A shared storage area of a plurality of storage virtualization apparatuses connected to a host apparatus and a storage subsystem stores device configuration information expressing a logical device configuration in the storage virtualization apparatuses. The logical device configuration is a relationship between an external storage device in the storage subsystem, a virtual device serving as a virtualized storage space of a storage resource provided by one or more of the external storage devices, and one or more logical storage devices constituting an internal storage device in the storage virtualization apparatus. A newly connected storage virtualization apparatus reads the device configuration information from the shared storage area, and writes the read device configuration information into a configuration information storage area of the storage virtualization apparatus.

18 Claims, 18 Drawing Sheets

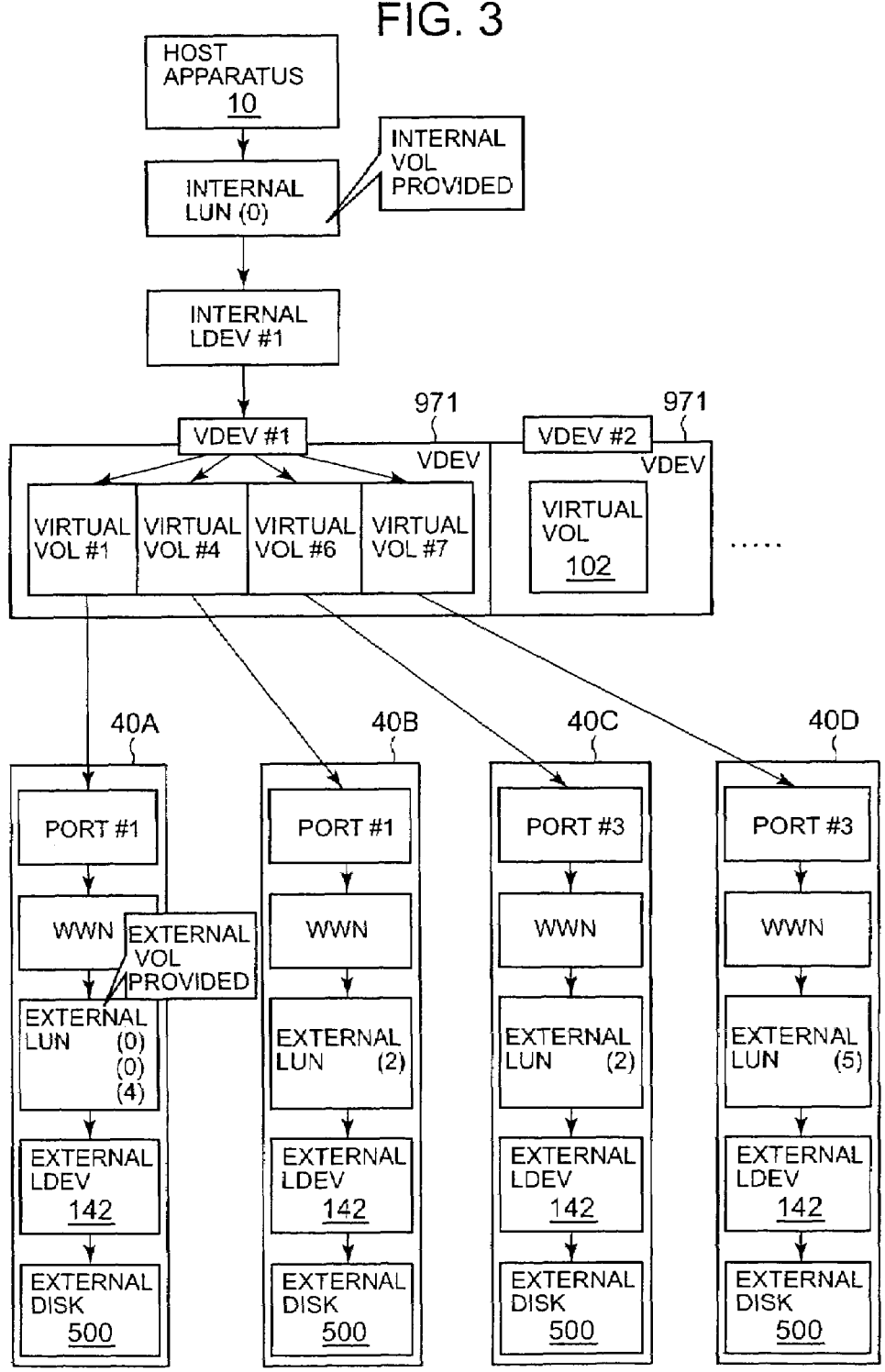

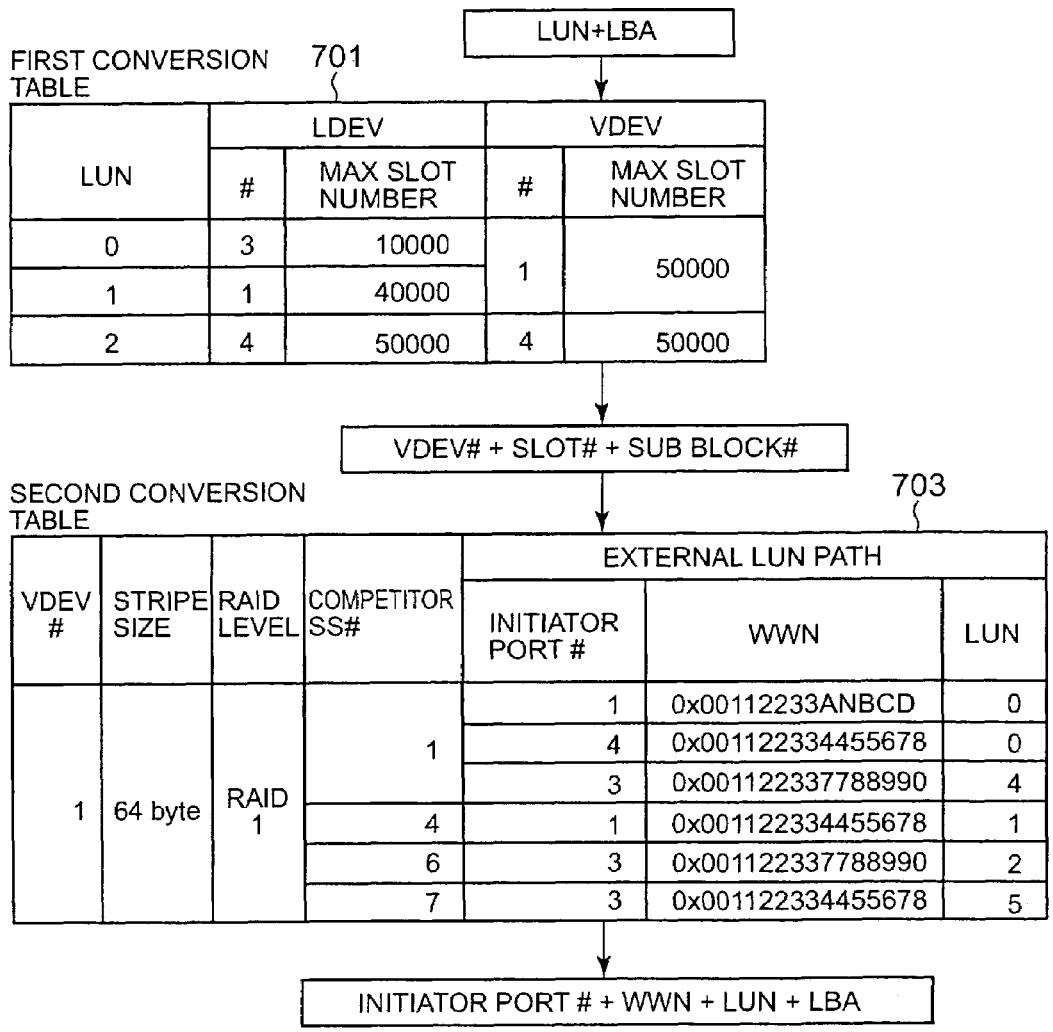

FIG. 9

| EYE CATCHER |
|---|
| FORMAT REVISION NUMBER |
| NUMBER OF MAPPED STORAGE VIRTUALIZATION APPARATUSES (=k) |
| UNIQUE MANAGEMENT NUMBER |
| VIRTUALIZATION APPARATUS INFORMATION (×k) |
| OWNER INFORMATION |
| VIRTUAL VOL INFORMATION |
| INTERNAL LDEV INFORMATION |
| HOST/VIRTUALIZATION APPARATUS INFORMATION |

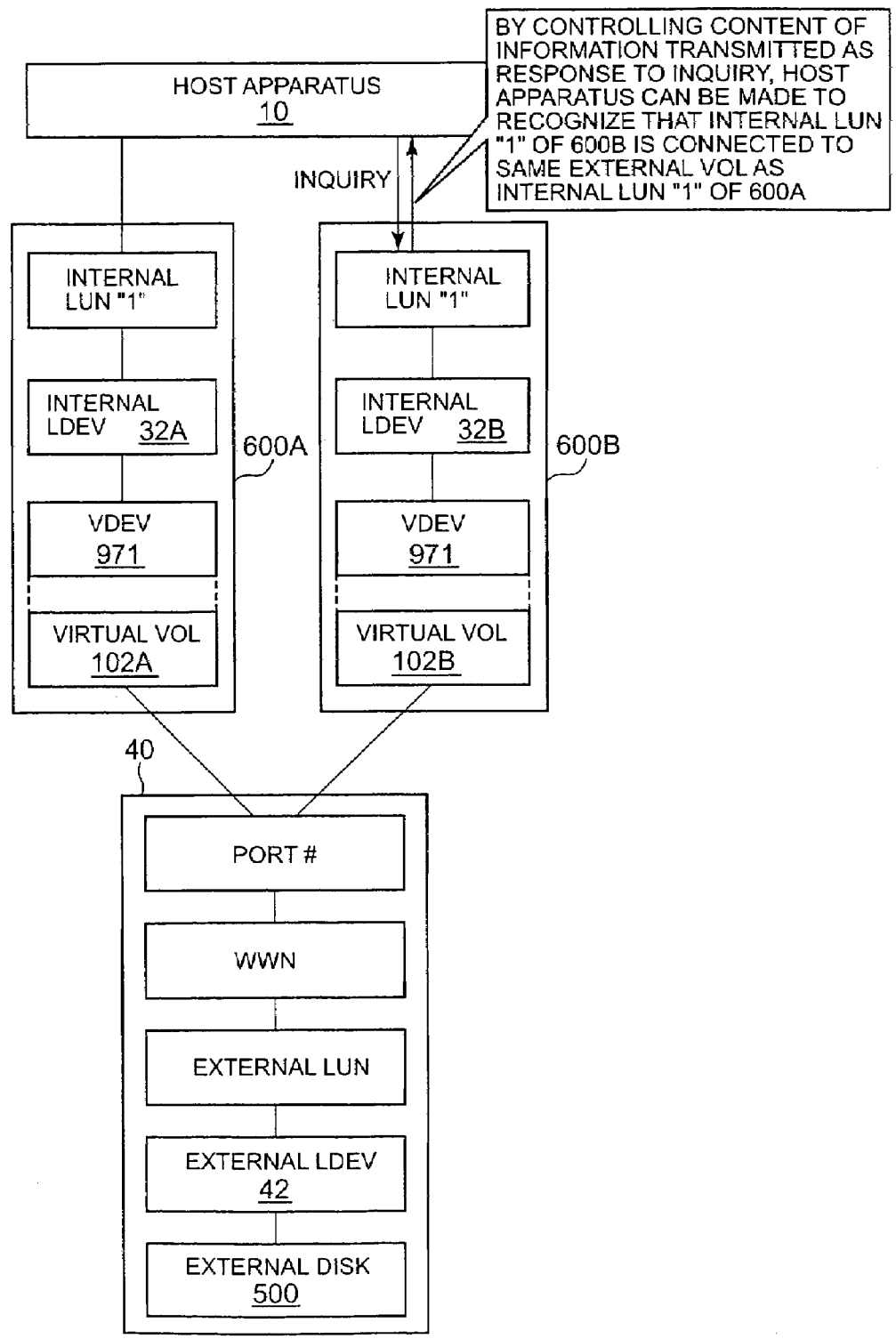

US 7,636,818 B2

STORAGE VIRTUALIZATION SYSTEM AND METHOD

CROSS-REFERENCE TO PRIOR APPLICATION

This application relates to and claims priority from Japanese Patent Application No. 2006-160008, filed on Jun. 8, 2006, the entire disclosure of which is incorporated herein by reference.

BACKGROUND OF THE INVENTION

1. Field of the Invention

The present invention relates to a storage virtualization technique.

2. Description of the Related Art

An apparatus (storage virtualization apparatus hereafter) which is capable of virtually providing a storage device existing in an external storage subsystem to an upper order apparatus as an internal storage device is known. An example of this type of apparatus is disclosed in Japanese Unexamined Patent Application No. 2005-107645, for example.

According to this technique, a plurality of paths (alternative paths) connected to the storage device in the storage subsystem are provided between the storage virtualization apparatus (first storage control apparatus) and the storage subsystem (second storage control apparatus) such that even when a fault occurs on one of the plurality of alternative paths, the storage virtualization apparatus can access the storage device in the storage subsystem via another alternative path. A technique disclosed in Japanese Unexamined Patent Application No. 2006-40026, for example, is known as a path switching technique.

When only one storage virtualization apparatus is provided and the storage virtualization apparatus malfunctions, the storage device in the storage subsystem cannot be provided to the upper order apparatus. To reduce the likelihood of this problem, a method of providing the storage virtualization apparatus with redundancy may be considered. For example, at least one more storage virtualization apparatus is connected to the storage subsystem connected to the storage virtualization apparatus.

When this method is employed, a logical device configuration enabling access to the storage device in the storage subsystem must be identical in all of the storage virtualization apparatuses interposed between the upper order device and the storage subsystem. This is so that the upper order apparatus can access the same storage device in the storage subsystem via any of the storage virtualization apparatuses. (For example, the logical device configuration may include a combination of a number (LDEV#) of a logical storage device (LDEV) and a number (VDEV#) of a virtual storage device (VDEV), a LUN within the storage subsystem, which is mapped to the VDEV#, and so on.)

However, if a person (a manager of the storage virtualization system, for example) must construct the logical device configuration in an added storage virtualization apparatus, this places a load on the person. Moreover, it is not always possible to construct an identical device configuration to the logical device configuration in the existing storage virtualization apparatus accurately in the added storage virtualization apparatus since human input errors may occur.

The storage virtualization apparatus may be replaced by another storage virtualization apparatus, but in this case also problems such as those described above may occur since the logical device configuration constructed in the original storage virtualization apparatus must be constructed in the replacement storage virtualization apparatus.

SUMMARY OF THE INVENTION

An object of the present invention is to enable an identical logical device configuration to be constructed in a plurality of storage virtualization apparatuses without placing a heavy load on a person.

Other objects of the present invention will become clear from the following description.

A storage virtualization system according to the present invention comprises a plurality of storage virtualization apparatuses connected to an upper order apparatus and a storage subsystem, and a shared storage area shared by the plurality of storage virtualization apparatuses. The shared storage area stores device configuration information expressing a logical device configuration in the storage virtualization apparatuses. The logical device configuration is a relationship between an external storage device serving as a storage device of the storage subsystem, a virtual device serving as a virtualized storage space of a storage resource provided by one or a plurality of the external storage devices, and one or more logical storage devices constituting an internal storage device serving as a storage device in the storage virtualization apparatuses. Each of the plurality of storage virtualization apparatuses comprises a configuration information storage area for storing the device configuration information, and a controller for receiving a first access command specifying an internal storage device from the upper order apparatus, generating a second access command for accessing an external storage device associated with the specified internal storage device on the basis of the device configuration information stored in the configuration information storage area, and transmitting the second access command to the storage subsystem. The controller of a newly connected storage virtualization apparatus from among the plurality of storage virtualization apparatuses, which is newly connected to the upper order apparatus and the storage subsystem, reads the device configuration information from the shared storage area and writes the read device configuration information into the configuration information storage area.

The shared storage area may exist in the plurality of storage virtualization apparatuses, in the storage subsystem, or in a location outside of the plurality of storage virtualization apparatuses and the storage subsystem.

In a first embodiment, the plurality of storage virtualization apparatuses comprise a first storage virtualization apparatus, and a second storage virtualization apparatus connected to the upper order apparatus and the storage subsystem after the first storage virtualization apparatus. The first storage virtualization apparatus may comprise a first configuration information storage area and a first controller. The device configuration information expressing the logical device configuration in the first storage virtualization apparatus may be stored in the first configuration information storage area, and the first controller may read the device configuration information from the first configuration information storage area and write the device configuration information into the shared storage area. The second storage virtualization apparatus may comprise a second configuration information storage area and a second controller. The second controller may read the device configuration information from the shared storage area and write the device configuration information into the second configuration information storage area.

In a second embodiment, the shared storage area is a system area of the external storage device mapped in the device configuration information. For example, the system area is a storage area that can be accessed by each of the plurality of storage virtualization apparatuses but is not accessed by the second access command issued on the basis of the first access command from the upper order apparatus.

In a third embodiment, the shared storage area is provided in a different external storage device to the external storage device mapped in the device configuration information.

In a fourth embodiment pertaining to the first embodiment, when the external storage device mapped in the device configuration information is not provided with a system area, the first controller may set the shared storage area in a different external storage device to the external storage device mapped in the device configuration information, and when the external storage device mapped in the device configuration information is provided with a system area, the first controller may set the shared storage area in the system area of the external storage device mapped in the device configuration information.

In a fifth embodiment, one of the plurality of storage virtualization apparatuses may comprise a different logical storage device to the logical storage device. In this case, the shared storage area is provided in the different logical storage device.

In a sixth embodiment pertaining to the first embodiment, when an external storage device that can be used as the shared storage area is not provided in the storage subsystem, the first controller may set the shared storage area as the different logical storage device, and when an external storage device that can be used as the shared storage area is provided in the storage subsystem, the first controller may set the shared storage area in the external storage device.

In a seventh embodiment, the device configuration information includes, in addition to the information expressing the logical device configuration, a code sequence indicating that the device configuration information is the device configuration information. The code sequence exists in a predetermined location of the device configuration information. The controller of the newly connected storage virtualization apparatus may issue a read command specifying the location of the code sequence to the shared storage area, and when data read in accordance with the read command are the code sequence, the controller of the newly connected storage virtualization apparatus may issue a read command for reading the remainder of the device configuration information to the shared storage area.

In an eighth embodiment pertaining to the seventh embodiment, the storage subsystem comprises a communication port serving as a target of each storage virtualization apparatus, a plurality of devices including the external storage device, and a plurality of logical unit numbers (LUNs) corresponding respectively to the plurality of devices. One or more of the plurality of LUNs belong to each communication port in the storage subsystem. The shared storage area is the external storage device. The controller of the newly connected storage virtualization apparatus may recognize the target communication port upon connection to a network to which the storage subsystem is connected, issue a first inquiry command to the target communication port, receive notification of the one or more LUNs belonging to the target communication port in response to the first inquiry command, issue a second inquiry command to each of the one or more LUNs, receive attribute data expressing an attribute relating to the specified LUNs in response to the second inquiry command, and when the attribute data are data indicating the external storage device, issue the read command specifying the location of the code sequence to the shared storage area.

In a ninth embodiment, the controller of one of the plurality of storage virtualization apparatuses may write modification desire information, which is information expressing a desire to modify the device configuration information, in the shared storage area. When the external storage device mapped in the device configuration information is in use, another controller in another of the plurality of storage virtualization apparatuses may write modification denial information denying modification into the shared storage area, and when the external storage device mapped in the device configuration information is not in use, the other controller in the other storage virtualization apparatus may write modification permission information permitting modification into the shared storage area. When the modification denial information is written in the shared storage area, the controller does not modify the device configuration information, and when the modification permission information is written in the shared storage area and the modification denial information is not written in the shared storage area, the controller may modify the device configuration information.

In a tenth embodiment pertaining to the ninth embodiment, the device configuration information includes a level of priority for each of the plurality of storage virtualization apparatuses. It is possible to prevent the controller from writing the modification desire information into the shared storage area when the level of priority of the storage virtualization apparatus is equal to or lower than a predetermined value.

In an eleventh embodiment pertaining to the ninth embodiment, a number of mapped storage virtualization apparatuses (=k, k being an integer of 2 or more) is recorded in the device configuration information. The controller may modify the device configuration information when the modification permission information is written into the shared storage area k−1 times.

In a twelfth embodiment, upon reception of a specific inquiry command from the upper order apparatus, the controller of the newly connected storage virtualization apparatus may transmit inquiry response information including unique information relating to the external storage device mapped in the device configuration information that is stored in the configuration information storage area.

In a thirteenth embodiment pertaining to the twelfth embodiment, the device configuration information includes a unique ID constituted by a code sequence which is unique to the device configuration information. The controller may extract the unique ID from the device configuration information and transmit the inquiry response information including the unique ID.

In a fourteenth embodiment pertaining to the twelfth embodiment, the controller may extract information unique to the external storage device mapped in the device configuration information from the inquiry response information received after issuing the specific inquiry command to the external storage device, and upon reception of the specific inquiry command from the upper order apparatus, transmit inquiry response information including the extracted unique information.

In a fifteenth embodiment pertaining to the twelfth embodiment, the upper order apparatus may comprise an inquiry unit for transmitting the specific inquiry command to each internal storage device, an alternative path recognition unit which, when identical unique information is included in the inquiry response information received in response to each of the specific inquiry commands, recognizes that each path that receives the inquiry response information is an alternative path connected to the same storage device, and a path switching unit for switching the alternative path to be used from among the plurality of recognized alternative paths.

In a sixteenth embodiment pertaining to the fifteenth embodiment, the path switching unit may switch the alternative path in any of following cases (A) through (D):

(A) when the same alternative path has been used a predetermined number of consecutive times;
(B) when a notification indicating that a load of the used alternative path has exceeded a predetermined value is received from the storage virtualization apparatus through which the alternative path passes;
(C) when no response is received from the storage virtualization apparatus through which the used alternative path passes; and
(D) when an instruction to switch the used alternative path is received from a server for managing the plurality of alternative paths between the plurality of storage virtualization apparatuses and the upper order apparatus.

In a seventeenth embodiment, the shared storage area is provided in the external storage device. The device configuration information includes, in addition to the information expressing the logical device configuration, a code sequence indicating that the device configuration information is the device configuration information. The code sequence exists in a predetermined location of the device configuration information. The plurality of storage virtualization apparatuses comprise a first storage virtualization apparatus, and a second storage virtualization apparatus which is connected to the upper order apparatus and the storage subsystem after the first storage virtualization apparatus. The first storage virtualization apparatus comprises a first configuration information storage area and a first controller. The device configuration information expressing the logical device configuration in the first storage virtualization apparatus is stored in the first configuration information storage area, and the first controller can read the device configuration information from the first configuration information storage area and write the device configuration information into the shared storage area. The second storage virtualization apparatus comprises a second configuration information storage area and a second controller. The second controller may issue a read command specifying the location of the code sequence to the shared storage area, and when data read in accordance with the read command are the code sequence, the second controller may issue a read command for reading the remainder of the device configuration information to the shared storage area, and write the device configuration information including the read information and the code sequence into the second configuration information storage area. Upon reception of a specific inquiry command from the upper order apparatus, the second controller may transmit inquiry response information including unique information relating to the external storage device mapped in the device configuration information that is stored in the second configuration information storage area. The upper order apparatus may comprise an inquiry unit for transmitting the specific inquiry command to each internal storage device, and an alternative path recognition unit which, when identical unique information is included in the inquiry response information received in response to each of the specific inquiry commands, recognizes that each path that receives the inquiry response information is an alternative path connected to the same storage device.

The processing performed by the storage virtualization apparatus, storage subsystem, and upper order apparatus may be executed by various predetermined units. Various units may be interpreted as various means. Each unit or each means may be realized by hardware (a circuit, for example), a computer program, or a combination of the two (for example, one or a plurality of CPUs which read and execute a computer program). Each computer program may be read from a storage resource (memory, for example) provided in a computer machine. Each computer program may be installed in the storage resource via a storage medium such as a CD-ROM or DVD (Digital Versatile Disk) or downloaded via a communication network such as the Internet or a LAN.

BRIEF DESCRIPTION OF THE DRAWINGS

FIG. 3 shows an example of a logical device configuration;

FIG. 4A shows an example of device configuration information 101 for the device configuration shown in FIG. 3;

FIG. 4B shows a modified example of a second conversion table;

FIG. 9 shows a configuration example of the device configuration information 101;

FIG. 15 is an illustrative view showing an outline of measures taken to cause a host apparatus 10 to recognize an alternative path;

DETAILED DESCRIPTION OF THE PREFERRED EMBODIMENT

An outline of an embodiment of the present invention will now be described.

A first storage virtualization apparatus comprises a first storage area (for example, a shared memory to be described below) Information (device configuration information hereafter) expressing a logical device configuration in the first storage virtualization apparatus is stored in the first storage area. A shared storage area (a logical volume, for example) that can be accessed by the first storage virtualization apparatus and a second storage virtualization apparatus is prepared in at least one of the first storage virtualization apparatus and a storage subsystem. The first storage virtualization apparatus writes the device configuration information into the shared storage area. The second storage virtualization apparatus, which is connected to the storage subsystem, reads the device configuration information from the shared storage area and writes the device configuration information into its own second storage area. This signifies that the logical storage devices in the first storage virtualization apparatus have been constructed in the second storage virtualization apparatus. In other words, according to this method, the logical device configuration in the first storage virtualization apparatus can be constructed in the second storage virtualization apparatus with substantially no load placed on a person.

Further, in this embodiment a second path passing through the second storage virtualization apparatus can be laid out between an upper order apparatus (for example, a host apparatus to be described below) and a storage device (for example, an external VOL to be described below) in the storage subsystem in place of, or in addition to, a first path which passes through the first storage virtualization apparatus. Upon reception of a predetermined inquiry from the upper order device via the second path, the second storage virtualization apparatus prepares information including the same information elements as information transmitted in response upon reception of a predetermined inquiry via the first path, and transmits the prepared information to the upper order apparatus. As a result, the upper order apparatus can be made to recognize that the storage device corresponding to the second path is identical to the storage device corresponding to the first path.

An embodiment of the present invention will be described in detail below with reference to the drawings. Note that in the following description, elements (memory, for example) in the storage virtualization apparatus will occasionally be referred to as "internal elements", and elements inside the storage subsystem on the exterior of the storage virtualization apparatus will occasionally be referred to as "external elements". Identical parent numerals are used for similar elements and a combination of a parent numeral and a child symbol is used to differentiate between similar elements.

Figure 1:
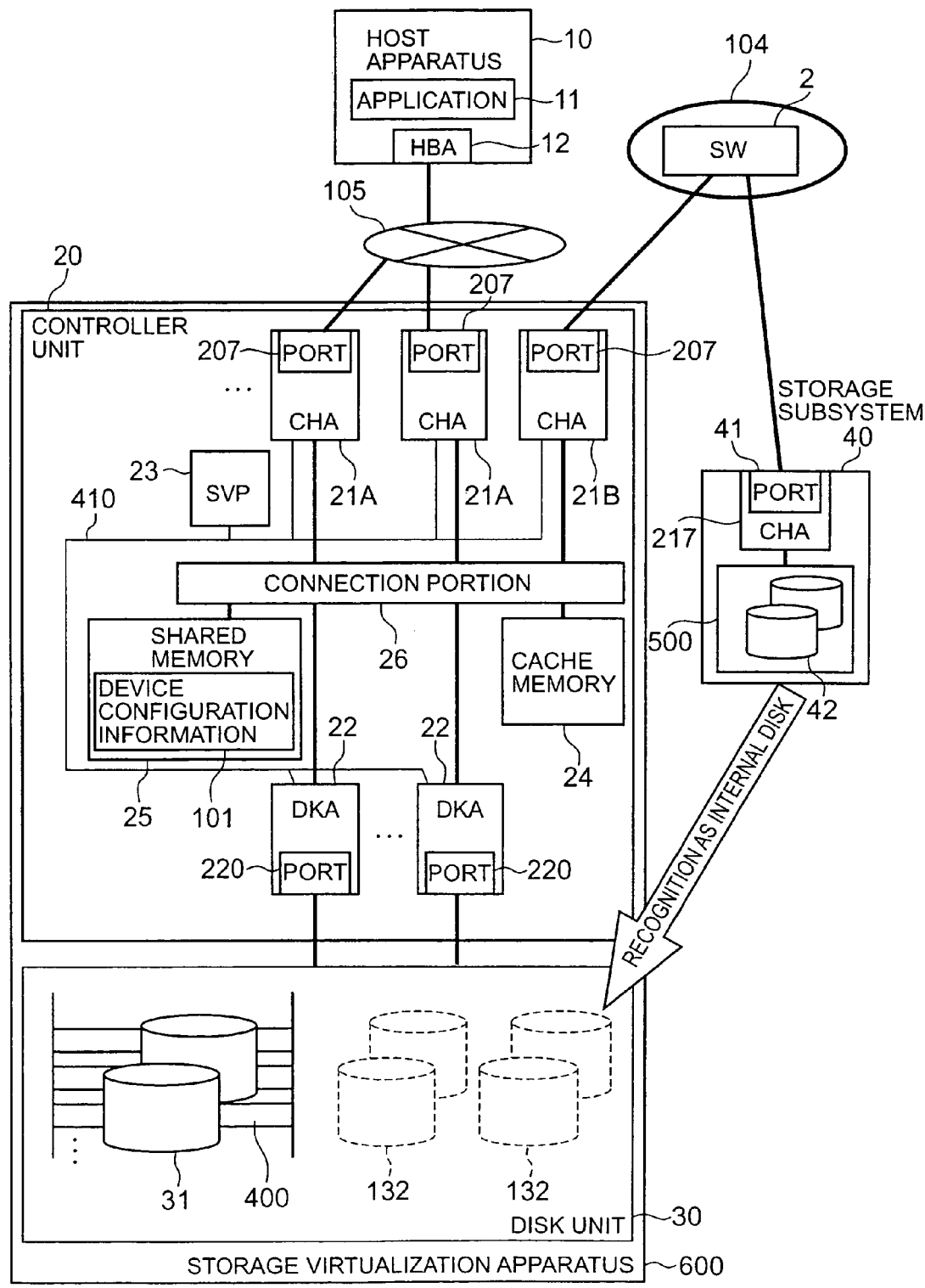
FIG. 1 is a block diagram showing a configuration example of a computer system according to an embodiment of the present invention.

FIG. 1 is a block diagram showing a configuration example of a computer system according to an embodiment of the present invention.

A host apparatus 10 and a storage virtualization apparatus 600 are connected to a first communication network 105. The storage virtualization apparatus 600 and a storage subsystem 40 are connected to a second communication network 104. Various networks, for example a SAN (Storage Area Network) including one or a plurality of switches 2, may be used for the first communication network 105 and second communication network 104.

The host apparatus 10 is a computer apparatus comprising information processing resources such as a CPU (Central Processing Unit) and memory, for example, and is constituted by a personal computer, a workstation, a mainframe, or similar, for example. The host apparatus 10 comprises an information input apparatus (not shown) such as a keyboard switch, a pointing device, or a microphone, for example, and an information output apparatus (not shown) such as a monitor display or a speaker, for example. The host apparatus 10 is also provided with an application program 11 for executing predetermined processing, and a host bus adapter 12 for accessing the storage virtualization apparatus 600 via the communication network 105, for example. Path switching software to be described below, path recognition software capable of recognizing an alternative path, and so on are used as the application program 11, for example.

The storage virtualization apparatus 600 may be constituted by a RAID (Redundant Array of Independent (or Inexpensive) Disks) system comprising a large number of disks 400 arranged in array form, for example. Note, however, that the present invention is not limited thereto, and the storage virtualization apparatus 600 may be constituted by a switch in a communication network, for example a high-performance intelligent fibre channel switch. As will be described below, the storage virtualization apparatus 600 is used to provide the host apparatus 10 with the storage resources of the storage subsystem 40 as an internal logical volume (Logical Unit), and therefore does not require a directly self-administered local storage device.

The storage virtualization apparatus 600 may be divided broadly into a controller unit 20 and a disk unit 30. The controller unit 20 comprises a channel adapter (CHA hereafter) 21, a disk adapter (DKA hereafter) 22, an SVP (Service Processor) 23, a cache memory 24, a shared memory 25, and a connection portion 26, for example.

The CHA 21 performs data communication with an external apparatus (for example, the host apparatus 10 or storage subsystem 40) via a communication port 207. The CHA 21 is constituted by a microcomputer system comprising a CPU, memory, and so on, for example. The CHA 21 is allotted a network address (for example a WWN (World Wide Name)) for identifying the CHA 21. The CHA 121 comprisesa CHA 21A connected to the host apparatus 10 and a CHA 21B connected to the storage subsystem 40. The CHA 21A and the CHA 21B may be constituted integrally.

The DKA 22 comprises a communication port 220 for connecting to the disks (internal disks hereafter) 400 provided in the disk unit 30, and is capable of communicating with the internal disk 400 via the communication port 220. The DKA 22 is constituted by a microcomputer system comprising a CPU, memory, and so on, for example. The DKA 22 is capable of writing data written in the cache memory 24 from the CHA 21A into the internal disk 400 and writing data read from the internal disk 400 into the cache memory 24. The DKA 22 is also capable of converting a logical address into a physical address during data input/output to and from the internal disk 400.

The cache memory 24 is volatile or non-volatile memory, for example, which is capable of temporarily storing data received from the host apparatus 10 and data read from the internal disk 400.

The shared memory 25 is non-volatile memory, for example, which stores information (control information hereafter) relating to control performed in the storage virtualization apparatus 600. The control information includes device configuration information 101, for example. The device configuration information 101 includes information expressing a logical device configuration in the storage virtualization apparatus 600. By means of the device configuration information 101, a storage resource (for example, a logical volume 42) existing in the storage subsystem 40 can be provided to the host apparatus 10 as if it were a storage resource (for example, a logical volume 32) existing in the storage virtualization apparatus 600. The device configuration information 101 will be described in detail below.

The connection portion 26 connects the CHA 21, DKA 22, cache memory 24, and shared memory 25 to each other. The connection portion 26 may be constituted by a high-speed bus such as an ultra fast crossbar switch which performs data transmission through a high-speed switching operation, for example.

A plurality of the internal disks 400 arranged in array form are included in the disk unit 30. The internal disk 400 may be constituted by a disk form storage apparatus such as a hard disk, a flexible disk, or an optical disk, for example. Another type of storage apparatus such as magnetic tape or semiconductor memory (for example, flash memory), for example, may be used instead of the internal disk 400. A logical volume (internal VOL hereafter) 31 is provided on the storage area of the internal disk 400. The internal VOL 31 is a logical volume set using a physical storage resource possessed by the internal disk 400, whereas the aforementioned logical volume (internal VOL hereafter) 132 is not a logical volume set using the internal disk 400. In other words, when the internal VOL 31 is to be accessed, the internal disk 400 is accessed, but when the internal VOL 132 is to be accessed, the external logical volume (external VOL hereafter) 42 is accessed.

The SVP 23 is an information processing terminal (for example, a notebook type personal computer) for performing maintenance or management of the storage virtualization apparatus 600. The SVP 23 is connected to a processor (for example, a CPU) in the CHA 21 and a processor in the DKA 22 via an internal LAN 410. The SVP 23 monitors the occurrence of malfunctions in the storage virtualization apparatus 600 and displays these malfunctions on a display screen, and orders closing processing and so on of the internal disk 400. The SVP 23 is also capable of inputting at least a part of the device configuration information 101. The SVP 23 can be operated from a remote information processing terminal.

The storage subsystem 40 may have a similar constitution to the storage virtualization apparatus 600 or a simpler constitution than the storage virtualization apparatus 600. The storage subsystem 40 comprises a CHA 217 having a communication port 41, and one or a plurality of disks (external disks hereafter) 817, for example. The external VOL 42 is provided on the storage area of the external disk 500. The external VOL 42 is handled as the internal VOL 132 of the storage virtualization apparatus 600.

A configuration example of the computer system according to this embodiment was described above. Note that the above description is merely an example, and other configurations may be employed. For example, the shared memory 25 and cache memory 24 may be provided as a shared memory area and a cache memory area in a single memory rather than as separate memories. Further, the controller unit 20 may be a circuit board comprising a CPU, a memory, and a communication port, for example. In this case, the CPU is capable of executing the processing performed by the plurality of CHAs and DKAs.

In this embodiment, the storage virtualization apparatus 600 may be provided with redundancy. A detailed description of this embodiment will be described below including this point.

Figure 2B:
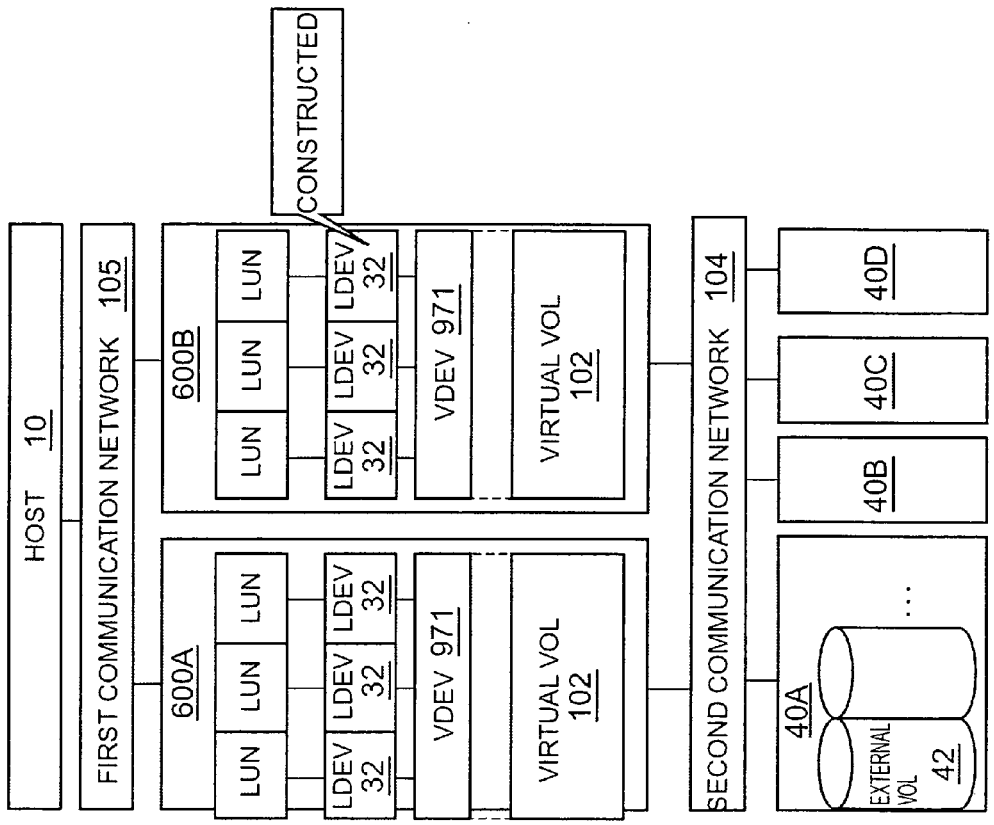
FIG. 2B shows a logical device configuration of a storage virtualization apparatus 600A constructed in an added storage virtualization apparatus 600B.
Figure 2A:
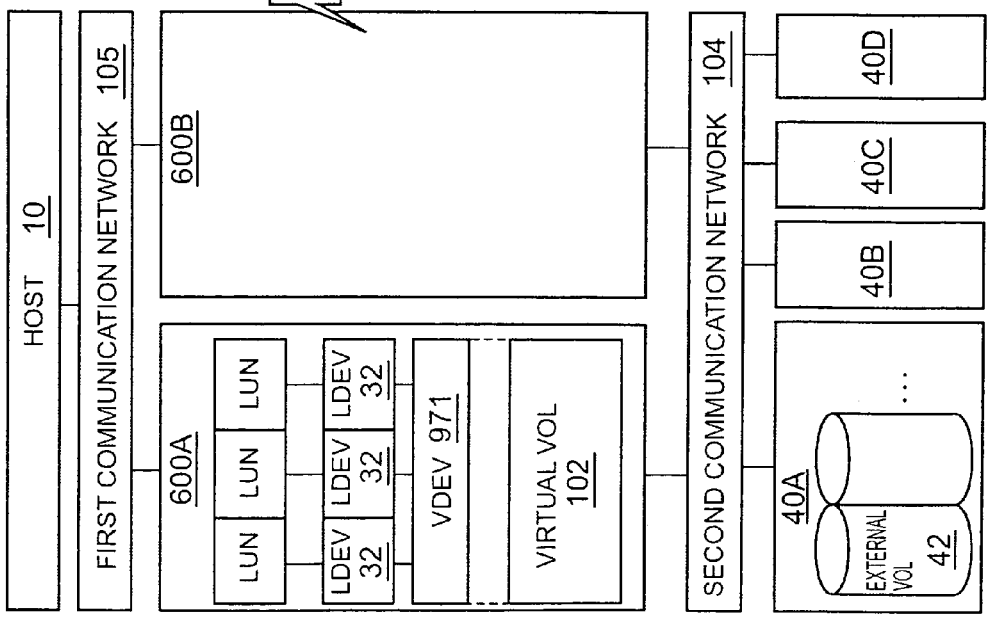
FIG. 2A is a pattern diagram showing a logical connection structure between a storage virtualization apparatus 600 and a storage subsystem 40.

FIG. 2A is a pattern diagram showing a logical connection structure between the storage virtualization apparatus 600 and the storage subsystem 40.

It is assumed, for example, that the host 10, a single storage virtualization apparatus 600A, and four storage subsystems 40A, 40B, 40C, 40D are provided. The storage virtualization apparatus 600A has a logical device configuration in which the external VOL 42 is associated with a VDEV 971 from a three layer storage hierarchy constituted by the VDEV 971, an internal LDEV 32, and an internal LUN (Logical Unit Number).

When a storage virtualization apparatus 600B is added under the conditions shown in FIG. 2A, processing to be described in detail below is performed such that the logical device configuration existing in the storage virtualization apparatus 600A can be constructed in the added storage virtualization apparatus 600B, as shown in FIG. 2B.

First, an example of a logical device configuration will be described in detail, whereupon processing for reconstructing the logical device configuration will be described.

The VDEV 971 is a virtual device positioned on the lowest layer of the logical storage hierarchy. The VDEV 971 is a virtualized storage space of the storage resources of the storage subsystems 40A to 40D, and a RAID configuration may be applied thereto. For example, one or a plurality of virtual logical volumes (virtual VOLs) serving as storage areas may be formed in a single VDEV 971.

The internal LDEV 32 is a logical storage device based on the storage space of the VDEV 971, and can be associated with the virtual VOL in the VDEV 971. One or a plurality of LDEVs 32 can be associated with the internal LUN. The LDEV or LDEVs 32 associated with the internal LUN can be provided to the host apparatus 10 as a single internal VOL by a single internal LUN.

Hence in this embodiment, the external VOL 42 is connected to the intermediate storage hierarchy (the VDEV 971) positioned between the internal VOL 132 and external VOL 42, and thus the external VOL 42 can be used as one of the internal VOLs 132.

FIG. 3 shows an example of a logical device configuration. FIG. 4A shows an example of the device configuration information 101 when the device configuration shown in FIG. 3 is used. Note that in the following description, numbers are used as the identification codes of the individual elements, and the numbers are expressed by the code "#".

The device configuration information 101 includes a first conversion table 701 and a second conversion table 703.

The first conversion table 701 is a LUN-LDEV-VDEV conversion table for converting data specifying the internal LUN into data for the VDEV 971. The table 701 is constituted by the internal LUN, an internal LDEV# and maximum slot number corresponding to the internal LUN, a VDEV# and maximum slot number corresponding to the internal LDEV#, and so on, for example. Further, although not shown in the drawing, information such as correspondence between the LBAs of each internal LDEV and the subblocks of each slot of the cache memory 24 may also be recorded in the table 701. Note that a slot is a single area of the cache memory 24.

The second conversion table 703 is constituted by the VDEV#, a stripe size, a RAID level, a number (SS#) for identifying the storage subsystem 40, an initiator port (a port of the storage virtualization apparatus) number, and an external WWN and external LUN (i.e. a WWN and LUN in the storage subsystem 40), for example. In this example, a RAID 1 is constructed in the VDEV #1 using the four storage subsystems 40A to 40D specified by the SS# (1, 4, 6, 7). In other words, four virtual logical volumes (virtual VOLs hereafter) #1, #4, #6, and #7 are associated with the VDEV #1, and the RAID 1 can be constructed by these four virtual VOLs. Note that the second conversion table 703 is not limited to the example shown in FIG. 4A, and a simpler table 703' shown in FIG. 4B, having no stripe size, no RAID level, and no competitor SS#, for example, may be employed instead.

Figure 5:
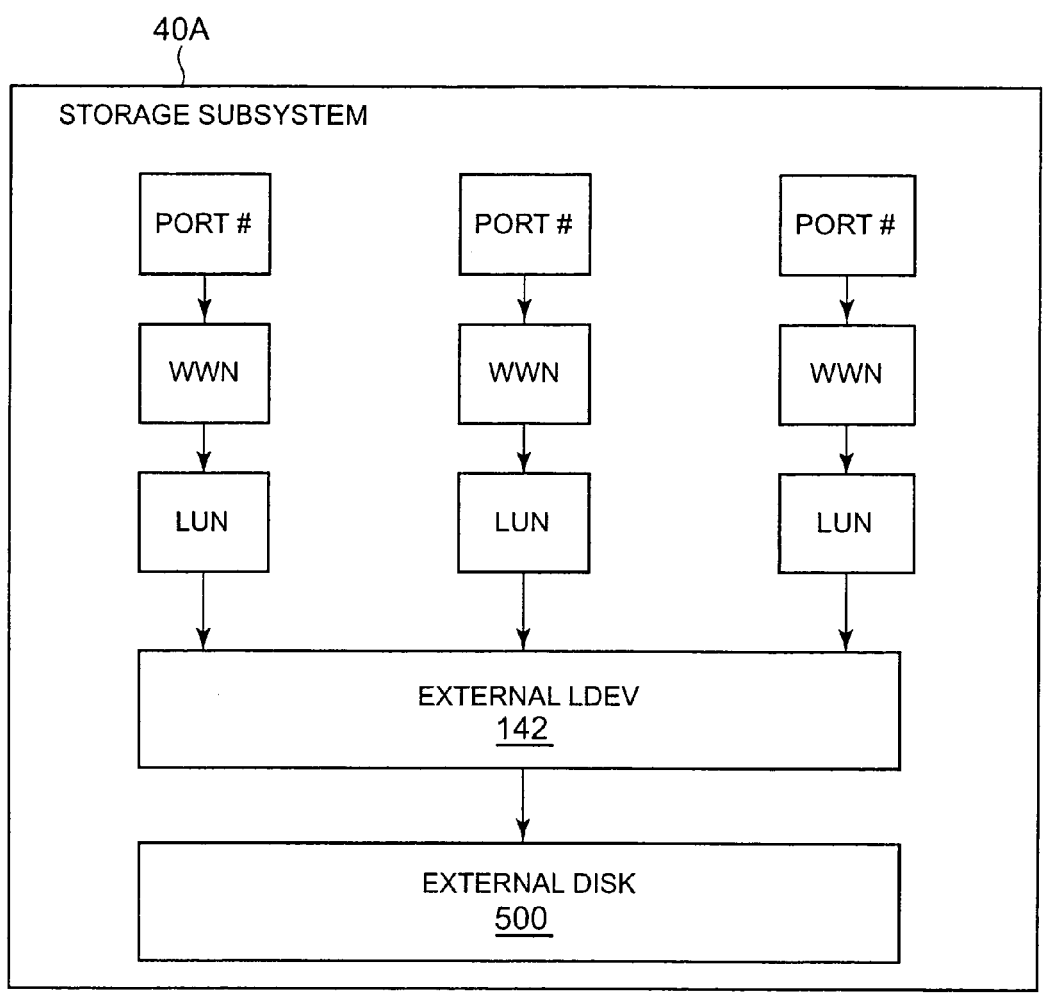
FIG. 5 shows an example of an alternative path formed in a storage subsystem 40A.

As shown in the example in FIG. 5, three paths (constituted by the initiator port #, external WWN, and external LUN, respectively) allocated to the SS #1 are allocated to the same external LDEV 142 in the storage subsystem 40A (in other words, an alternative path structure is provided). Hence, even when a fault occurs in any two of the three paths, the storage virtualization apparatus 600A is capable of accessing the external LDEV 142 via the remaining path.

One internal LDEV #3 is assumed to be associated with an internal LUN 0 provided in the host apparatus 10. In this case, the internal LDEV #3 is provided in the host apparatus 10 as the internal VOL 132.

The VDEV 971 has a VDEV# which serves as an interface to the VDEV 971, and an internal LDEV# and one or a plurality of virtual VOLs 102 can be associated with the VDEV#. More specifically, for example, an internal LDEV #1 and four virtual VOLs #1, #4, #6, and #7 are associated with the VDEV #1. The virtual VOL number corresponds to the competitor SS# in the second conversion table 703, for example. The virtual VOL 102 is a storage area of the VDEV 971. An external LUN path (initiator port #, external WWN, and external LUN) is associated with each virtual VOL #1, #4, #6, and #7.

By means of the configuration described above, when the storage virtualization apparatus 600A receives an access command (write command or read command) specifying an internal address (internal LUN 0 and logical block address (LBA)) from the host apparatus 10, access is generated to each of the four external VOLs.

More specifically, as shown in FIG. 4A, for example, the CHA 21A receives an access command specifying the internal LUN 0 and LBA from the host apparatus 10 via the communication port 207. The CHA 21A or 21B then converts the internal LUN 0 and LBA into an address for the VDEV 971 (VDEV#+SLOT#+SUBBLOCK#) on the basis of the first conversion table 701.

Next, referring to the second conversion table 703, the CHA 21A or 21B converts the address for the VDEV 971 into an external address (WWN+LUN+LBA). The CHA 21B transmits an access command specifying the converted external address to the storage subsystems 40A to 40D. As a result, access is performed to the external LDEV 142 corresponding to the specified external address in each of the storage subsystems 40A to 40D.

A case in which write access is performed will now be described.

Figure 6A:
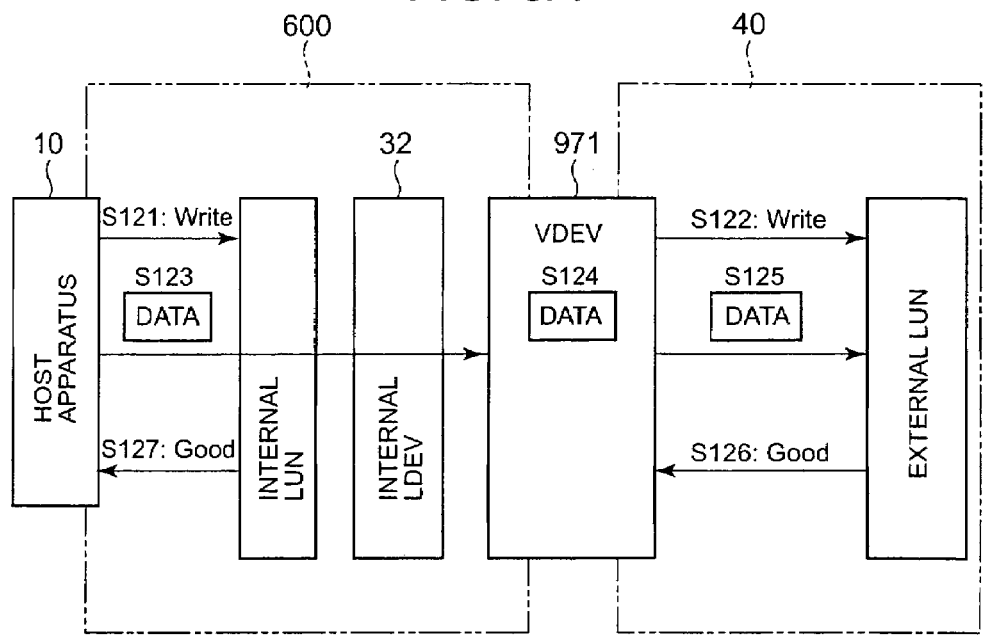
FIG. 6A is a flow diagram of data writing centering on a storage hierarchy.
Figure 6B:
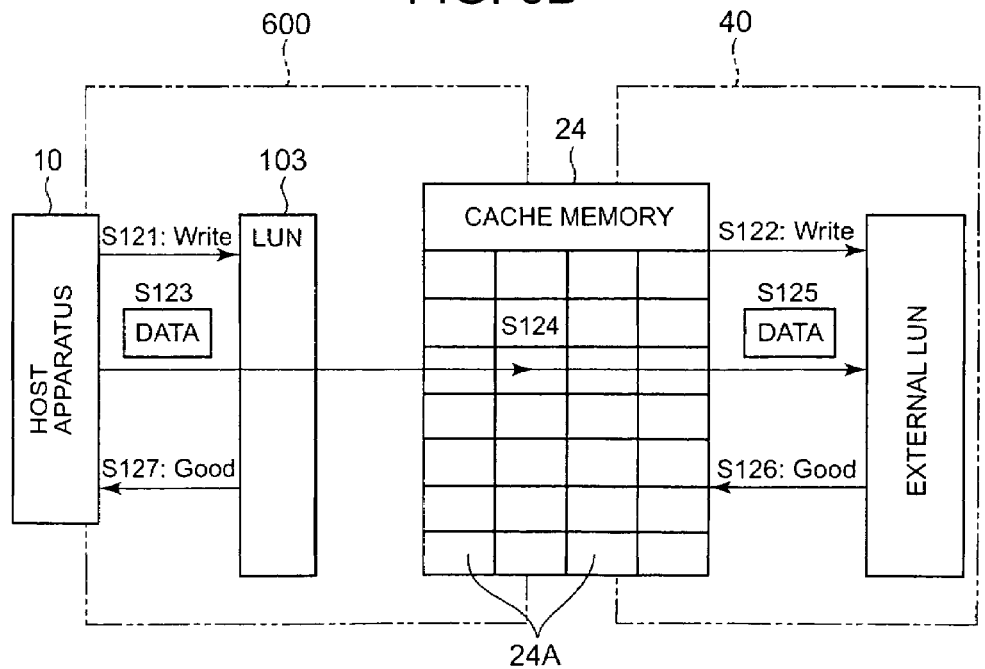
FIG. 6B is a flow diagram of data writing centering on the use of a cache memory 24.

FIG. 6A is a flow diagram of data writing centering on the storage hierarchy, and FIG. 6B is a flow diagram of data writing centering on use of the cache memory 24.

The host apparatus 10 issues a write command (Write) specifying an internal address (internal LUN and LBA), for example (step S121). Upon reception of the write command, the CHA 21A or 21B converts the specified internal address into an external address via a VDEV address, and the CHA 21B transmits a write command specifying the external command to the storage subsystem 40 (S122).

The host apparatus 10 transmits data corresponding to the write command to the CHA 21A (S123). Having been received in the CHA 21A, the data are transferred from the internal LDEV 32 via the VDEV 971 (S124) to the external LUN (S125). In S124, the data are stored in a location (an area on the cache memory 24) indicated by the address converted using the first conversion table 701.

When the data have been written in the external LDEV 142 (external disk 500) belonging to the transfer destination external LUN, the storage subsystem 40 transmits a writing completion report (Good) to the CHA 21B (S126). Upon reception of the writing completion report, the CHA 21B transmits a writing completion report to the CHA 21A which received the write command in S121, and the CHA 21A transmits the writing completion report to the host apparatus 10 (S127).

According to the flow described above, when data are written to the external LDEV 142, a writing completion report is transmitted to the host apparatus 10. Thus, data integrity can be ensured even when a plurality of storage virtualization apparatuses 600 exist between the host apparatus 10 and storage subsystem 40 and a different storage virtualization apparatus 600 is passed through when accessing the external LDEV 142. More specifically, when a write command for writing data to a certain area of the external LDEV 142 via the storage virtualization apparatus 600A is issued and immediately thereafter a read command for reading the data from the same area of the external LDEV 142 via a different storage virtualization apparatus 600B is issued, for example, it is possible to ensure that the data read in accordance with the read command are the data written in accordance with the write command issued immediately beforehand.

When this data assurance is provided, the timing of the writing completion report is not limited to the example described above. For example, both the CHA 21A and the storage subsystem 40 may issue a writing completion report when data are stored in the cache memory. In this case, when data are stored in the cache memory and a read command relating to the storage location of the data is received before the data are stored in the external LDEV 142, for example, both the CHA 21A and storage subsystem 40 are capable of returning the data in the cache memory.

Figure 7A:
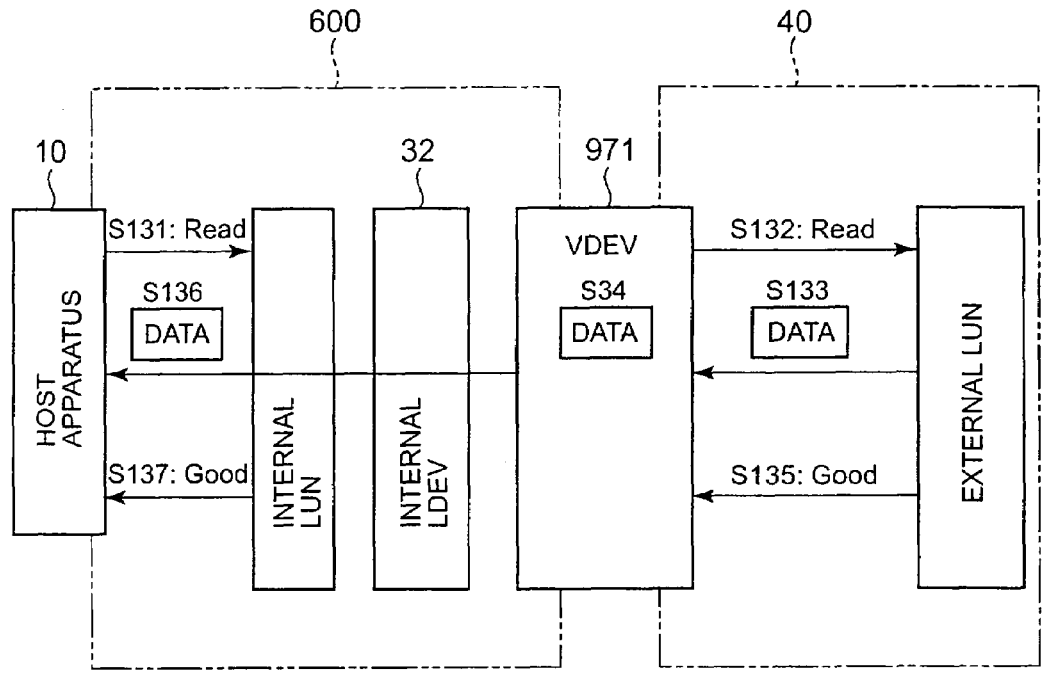
FIG. 7A is a flow diagram of data reading centering on the storage hierarchy.
Figure 7B:
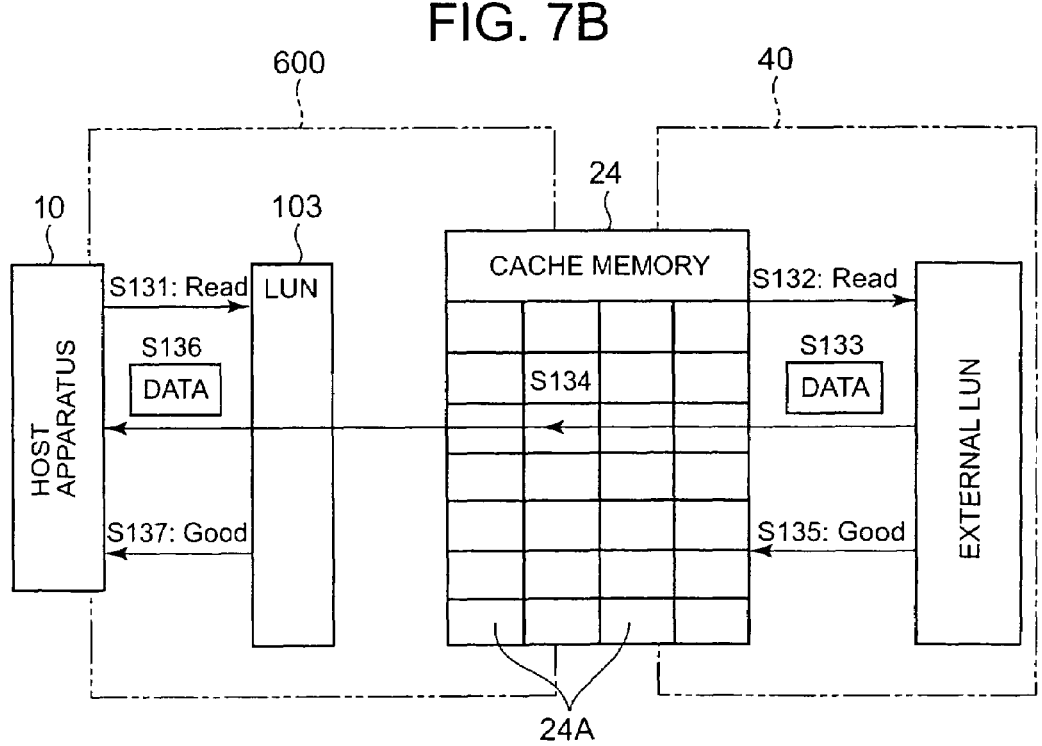
FIG. 7B is a flow diagram of data reading centering on the use of the cache memory 24.

FIG. 7A is a flow diagram of data reading centering on the storage hierarchy, and FIG. 7B is a flow diagram of data reading centering on use of the cache memory 24.

The host apparatus 10 transmits a read command specifying an internal address (S131). When the CHA 21A receives the read command, the CHA 21A or 21B converts the internal address into an external address via a VDEV address, and the CHA 21B transmits a read command specifying the external address to the storage subsystem 40 (S132). The storage subsystem 40 receives the read command from the CHA 21B, reads the data corresponding to the read command from the external LDEV 142, transmits the data to the CHA 21B (S133), and provides notification that reading has been completed normally (S135). The CHA 21B stores the data received from the storage subsystem 40 in a predetermined location (a location indicated by the VDEV address) of the cache memory 24 (S134). The CHA 21A reads the data stored in the cache memory 24, transmits the data to the host apparatus 10 (S136), and issues a reading completion report (S137).

Access between the storage virtualization apparatus 600 and storage subsystem 40 is performed according to the flow described above. To enable such access to be performed when the storage virtualization apparatus 600 is provided with redundancy, in this embodiment device configuration information input/output processing (configuration information IO processing hereafter), to be described in detail below, is performed.

In the following description, a case in which a single storage subsystem 40 is provided and the second storage virtualization apparatus 600B is provided instead of or in addition to the first storage virtualization apparatus 600A will be employed as an example, and several examples of configuration information IO processing will be described in detail. The processor installed in the CHA will be referred to as "CHP", and the processor installed in the DKA will be referred to as "DKP".

Figure 8:
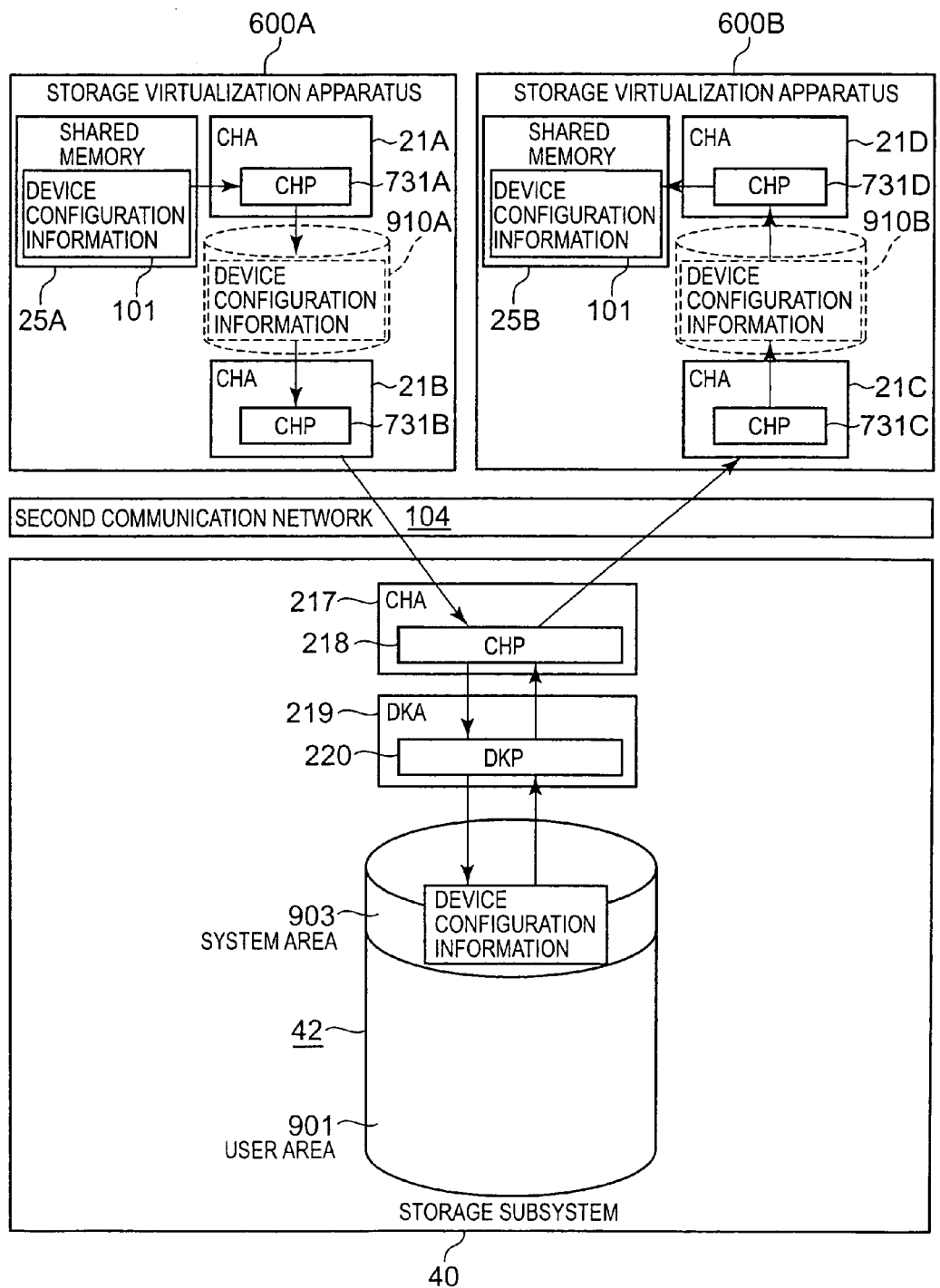
FIG. 8 shows a first example of configuration information IO processing.

FIG. 8 shows a first example of configuration information IO processing.

In the first storage virtualization apparatus 600A, a CHP 731A on the CHA 21A reads the device configuration information 101 from shared memory 25A and writes the device configuration information 101 into a specific storage area 910A. The storage area 910A may be any area of the physical storage resources in the first storage virtualization apparatus 600A. For example, the storage area 910A may be prepared on the shared memory 25A or cache memory.

A CHP 731B on the CHA 21B reads the device configuration information 101 from the storage area 910A and transmits a write command having the device configuration information 101 as write subject data to the storage subsystem 40. The external LUN in the external address indicating the write destination of the device configuration information 101 corresponds to one of the plurality of external VOLs 42 managed by the device configuration information 101, and the LBA in the external address is a system area 903 thereof.

Note that the system area 903 is an area storing information (system information hereafter, for example an operating system of the host apparatus 10, CHA, or DKA) relating to control of the storage virtualization apparatus 600, host apparatus 10, or storage subsystem 40, which is not accessed by the application 11 of the host apparatus 10. For example, when the storage virtualization apparatus 600, host apparatus 10, or storage subsystem 40 is activated, the system area 903 is accessed by the activated apparatus and the system information is read by the apparatus. Meanwhile, a user area 901 exists in the external VOL 42 as an area other than the system area 903. The user area 901 is an area storing data that are accessed by the application 11 of the host apparatus 10. Note that when a system area is provided, the VDEV 971 may be prepared on the basis of the user area of the external VOL 42.

In the storage subsystem 40, a CHP 218 on the CHA 217 receives a write command from the CHA 21B, transfers the write command to the DKA 219, and writes the device configuration information into cache memory, not shown in the drawing, in the storage subsystem 40. A DKP 220 on the DKA 219 reads the device configuration information from the cache memory and writes the read device configuration information into a location indicated in the external address corresponding to the write command, or in other words the system area 903 of the external VOL 42.

When the second storage virtualization apparatus 600B is connected to the second communication network 104, the second storage virtualization apparatus 600B (initiator) recognizes the port of the storage subsystem 40 (target) connected to the second communication network 104. A CHP 731C on a CHA 21C transmits a read command including an external address indicating the storage location of the device configuration information 101 to the recognized port. As a result, the device configuration information 101 is read from the system area 903 of the external VOL 42 to the CHA 21C. The CHP 731C then writes the read device configuration information into a specific storage area 910B. The storage area 910B may be any area of the physical storage resources in the second storage virtualization apparatus 600B. For example, the storage area 901B may be prepared on a shared memory 25B or cache memory.

A CHP 731D on a CHA 21D reads the device configuration information 101 from the storage area 910B and writes the device configuration information 101 into the shared memory 25B. As a result, the logical device configuration in the first storage virtualization apparatus 600A is constructed in the second storage virtualization apparatus 600B.

FIG. 9 shows a configuration example of the device configuration information 101.

The device configuration information 101 is a single set of information prepared for a single VDEV#, for example. The device configuration information 101 includes (A) an eye catcher, (B) a format revision number, (C) a number of mapped storage virtualization apparatuses (=k, k being an integer of 1 or more), (D) a unique management number, (E) virtualization apparatus information, (F) owner information, (G) virtual VOL information, (H) internal LDEV information, and (I) host/virtualization apparatus information, for example.

The eye catcher is a code sequence for recognizing the device configuration information 101. By reading and analyzing only the eye catcher part of the device configuration information 101, it is possible to determine whether or not the read part is part of the device configuration information 101.

The format revision number is a number indicating the format of the device configuration information 101. This is useful in cases such as when the format of the device configuration information is changed. By analyzing the format revision number, the subsequent configuration can be identified. More specifically, it is possible to identify which information elements are written in positions offset by a certain number of bytes from the top of the device configuration information, and the number of bytes occupied by these information elements. When these information elements have been identified and a desired information element is to be read, for example, the storage virtualization apparatus 600 simply has to issue a read command specifying the address corresponding to the desired information element.

The number of mapped storage virtualization apparatuses denotes the number of storage virtualization apparatuses mapped in the external VOL 42 managed by the device configuration information 101. When the device configuration information 101 is to be set in a shared storage area (for example, the aforementioned external VOL 42) that can be accessed by a plurality of storage virtualization apparatuses 600 or the device configuration information 101 is to be read by the storage virtualization apparatus 600 from the shared storage area and set in a predetermined internal storage area (for example, the shared memory 25), the storage virtualization apparatus 600 can update (increase by 1, for example) the value of k in the device configuration information 101 on the shared storage area. By referring to k, each storage virtualization apparatus 600 can determine the number of storage virtualization apparatuses 600 mapped in the same external VOL.

The unique management number is a number for identifying the device configuration information 101 as a whole. The unique management number may be constituted by information elements (for example, the vendor name, model name, and serial number of the storage subsystem 40) extracted from information (inquiry information hereafter) that is received in response to an inquiry command transmitted to the storage subsystem 40, for example. The unique management number is unique to the device configuration information. On the other hand, the aforementioned eye catcher need only be a number signaling the information type, i.e. device configuration information, and hence the same code sequence may be used by a plurality of device configuration information.

The virtualization apparatus information is information relating to the mapped storage virtualization apparatuses. More specifically, the virtualization apparatus information is constituted by the model names and serial numbers of the storage virtualization apparatuses, for example. Note that the virtualization apparatus information exists in an amount corresponding to the value of k.

The owner information is information relating mainly to the storage virtualization apparatus (owner) which manages the external VOL. For example, it is possible to ensure that the storage subsystem 40 only accepts modification of the device configuration information by the owner. Note that an order of precedence of the mapped storage virtualization apparatuses may be used instead of the owner information.

The virtual VOL information is information relating to the virtual VOLs associated with the VDEV#. More specifically, the virtual VOL information includes at least (1) and/or (2) and (3) of (1) a RAID level, (2) stripe information, (3) external VOL combination information (information indicating which external VOLs form sets with which external VOLs), and (4) an external LUN path (a path from the initiator port # of the storage virtualization apparatus to the external LUN), for example. The virtual VOL information corresponds to the second conversion table 703, for example.

The internal LDEV information is information relating to the internal LDEV 32 or plurality of internal LDEVs 32 associated with the virtual VOL 102 or plurality of virtual VOLs 102. More specifically, the internal LDEV information includes the size of the internal LDEV, the number of internal LDEVs, internal LDEV connection information (the number of internal LDEVs forming a single logical storage device), and internal LDEV attributes (for example, the LDEV#, emulation type, and so on), for example. An association is made between the internal LDEV and external VOL by a set of the virtual VOL information and internal LDEV information. Note that in this embodiment, the size of each individual internal LDEV is identical, and the size of the internal VOL provided by the internal LUN is determined according to the number of internal LDEVs associated with the internal LUN. The size of each internal LDEV may differ from the size of the other internal LDEVs.

The host/virtualization apparatus information is information relating to both the host and the storage virtualization apparatus. The host/virtualization apparatus information includes path definition information (for example, a set of the WWN of the storage virtualization apparatus, the internal LUN, and the internal LDEV#), and security information (for example, access restricting information set in the internal LUN and/or the internal LDEV), for example. The access restricting information includes information as to the host apparatuses that may perform access, whether these host apparatuses may perform read or write access, and so on, for example. Note that when the path definition information is provided, the combination of internal LUN—internal LDEV#—VDEV#—external WWN—external LUN can be made identical in the second storage virtualization apparatus 600B by combining the path definition information with the virtual VOL information and internal LDEV information.

When the path definition information is absent, the internal LUN may be set as an arbitrary internal LUN of the second storage virtualization apparatus 600B. In this case also, an identical logical device configuration to that of the first storage virtualization apparatus 600A can be constructed, and by applying measures to be described below, the host apparatus 10 can be caused to recognize an alternative path.

The device configuration information 101 described above may be constructed by a manager operating the SVP 23, for example. Alternatively, at least a part of the device configuration information 101 may be constructed by the CHA 21B on the basis of a response to a command issued by the CHA 21B to the CHA 217. More specifically, the CHA 21B is capable of recording a predetermined code sequence as the aforementioned (A), for example. The CHA 21B is also capable of recording a number corresponding to the format of the device configuration information 101 to be recorded as the aforementioned (B). The CHA 21B is also capable of recording an initial value 1 as (C) and information relating to itself as (E). The CHA 21B is also capable of transmitting an inquiry command to the storage subsystem 40 and using the various information elements included in the inquiry information obtained in response to generate (D), which is then recorded. The CHA 21B is also capable of creating (G) and (H) on the basis of these information elements and information relating to the internal LUN and internal LDEV managed by the storage virtualization apparatus 600A. (Specifically, the processing described in FIG. 5 of Japanese Unexamined Patent Application Publication 2005-107645 (U.S. application Ser. No. 10/769,805, US Publication No. US2005/0071559A1) may be employed to create (G) and (H), for example). The CHA 21B is also capable of recording information indicating itself as (F). The CHA 21B is also capable of recording information indicating (I) based on the information relating to the internal LUN and internal LDEV.

The device configuration information 101 of the first storage virtualization apparatus 600A is set in the second storage virtualization apparatus 600B by the configuration information IO processing described with reference to FIG. 8. This configuration information IO processing will now be described in detail.

Figure 10:
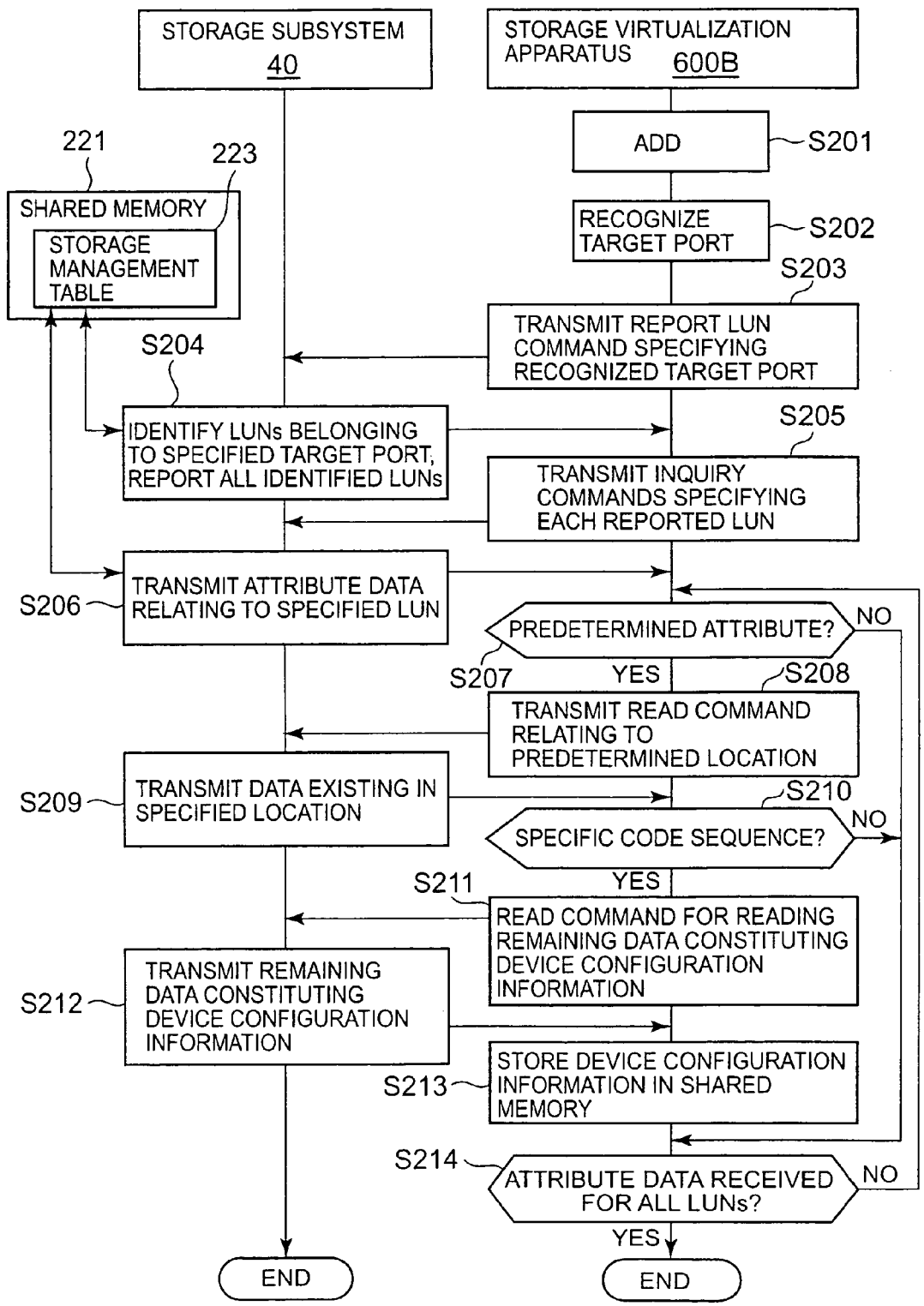
FIG. 10 shows a detailed example of the flow of the configuration information IO processing.

FIG. 10 shows a detailed example of the flow of the configuration information IO processing.

When the second storage virtualization apparatus 600B has been added (S201), the CHA 21C (initiator) of the second storage virtualization apparatus 600B recognizes the target port of the storage subsystem 40 (S202). The CHA 21C then transmits a report LUN command specifying the recognized target port (S203).

The CHA 217 comprising the target port identifies the LUNs belonging to the specified target port by referring to a storage management table 223 stored in shared memory 221, and informs the CHA 21C of all of the identified external LUNs (S204). The storage management table 223 is a table in which the WWN of the target port, the external LUNs belonging thereto, the device type which corresponds to the external LUN, and the external LDEV# belonging to the external LUN are recorded, for example.

The CHA 21C transmits inquiry commands respectively specifying the reported external LUNs (S205).

Having received the inquiry commands, the CHA 217 identifies the attribute data (for example, the device type of the logical unit corresponding to the LUN) relating to the LUN specified in the command by referring to the storage management table 223, and transmits the identified attribute data.

The CHA 21C then determines whether or not the received attribute data denote a predetermined attribute (S207). Here, the predetermined attribute is a storage apparatus type having an external VOL 42 that is capable of storing the device configuration information 101, for example, or more specifically a disk, for example.

If the received attribute data correspond to the predetermined attribute (YES in S207), the CHA 21C transmits a read command including an address indicating a predetermined location (S208). Here, the predetermined location is an area (for example, the top LBA of the external VOL 42) in which the eye catcher of the device configuration information 101 may exist, for example.

Upon reception of the read command from the CHA 21C, the CHA 217 instructs the DKA 219 to read data from the address of the read command in order to obtain the data existing at the address. The CHA 217 then transmits the obtained data (S209).

Upon reception of the data, the CHA 21C determines whether or not the data have a specific code sequence, or in other words whether or not the data are the eye catcher (S210).

When the received data are the eye catcher (YES in S210), the CHA 21C transmits a read command to read the remaining data constituting the device configuration information 101 (S211).

Upon reception of the read command, the CHA 217 instructs the DKA 219 to read data from the location corresponding to the read command in order to obtain the data existing in this location. The CHA 217 then transmits the obtained data (in other words, the parts of the device configuration information 101 other than the eye catcher) (S212).

The CHA 21C stores the device configuration information 101 constituted by the received eye catcher and the received parts of the device configuration information 101 other than the eye catcher in the shared memory 25B (S213).

Following NO in S207, NO in S210, or following S213, when the attribute data for all of the external LUNs reported in S205 have been received (YES in S214), the routine is terminated. Otherwise, S207 is performed with respect to the attribute data of another external LUN.

A first example of configuration information IO processing was described above. Note that in the above processing flow, the CHA 21C may read the format revision number in addition to the eye catcher, and when the device configuration information 101 is identified from the eye catcher, the configuration of the device configuration information 101 may be identified from the format revision number. Further, the CHA 21C may generate a write command to update the number k of mapped storage virtualization apparatuses such that the value of k is increased by 1, and then read the remaining data of the device configuration information 101.

Next, a second example of the configuration information IO processing will be described.

Figure 11:
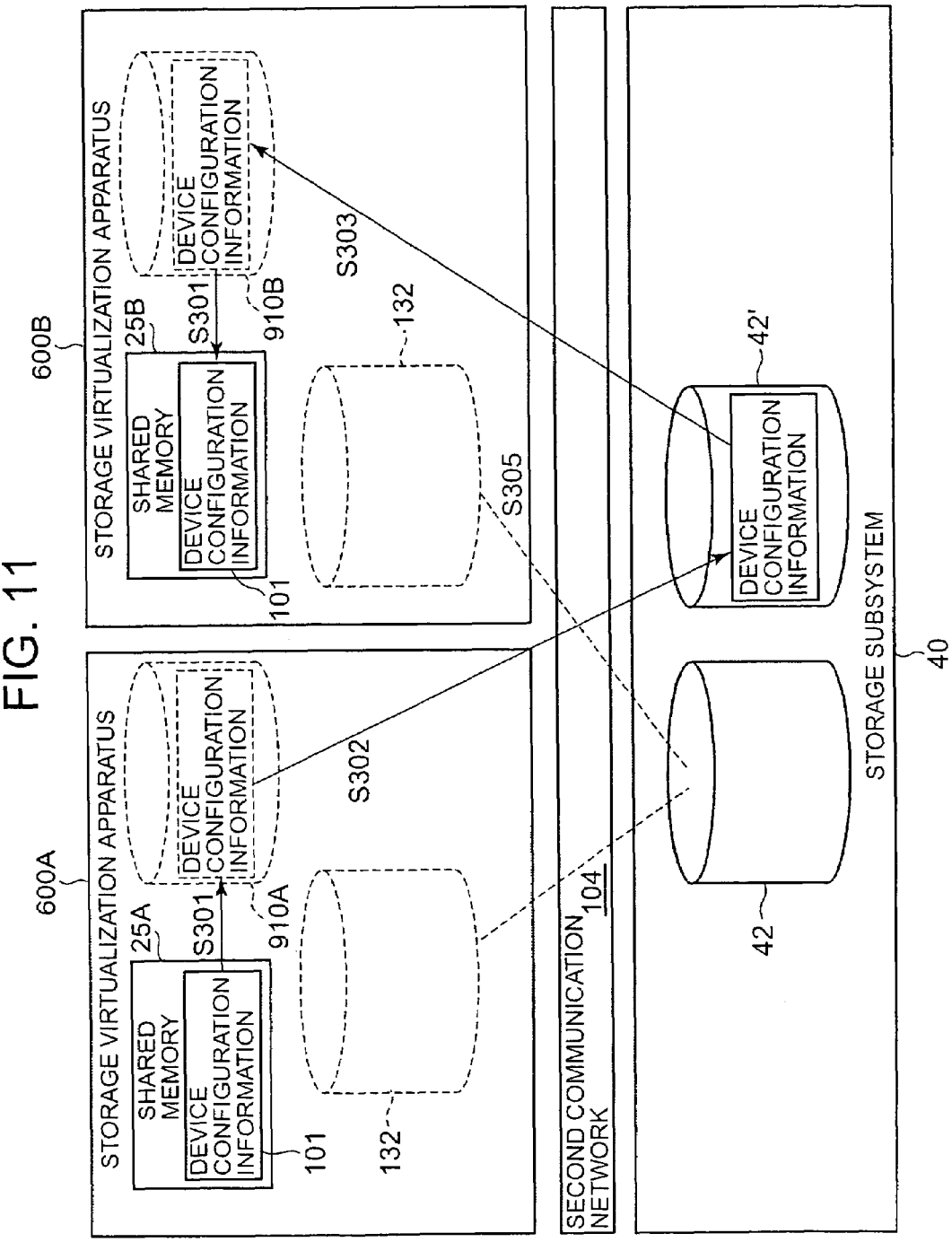
FIG. 11 shows a second example of the configuration information IO processing.

FIG. 11 shows a second example of the configuration information IO processing. The following description focuses mainly on differences with the first example, and similarities to the first example have been omitted or simplified (this applies likewise to third and fourth examples to be described below).

In the second example, the device configuration information 101 is stored in a new external VOL 42' rather than the external VOL 42 managed by the device configuration information 101. More specifically, for example, the first storage virtualization apparatus 600A reads the device configuration information 101 from the shared memory 25A and writes the read device configuration information 101 into the storage area 910A (S301). The device configuration information 101 is then read from the storage area 910A and written into the new external VOL 42' (S302). The new external VOL 42' may be an unused VOL selected from the storage subsystem 40. Selection of the unused VOL may be performed by the first storage virtualization apparatus 600A, for example.

The second storage virtualization apparatus 600B issues a read command to the external LUN having the predetermined attribute, whereby the device configuration information 101 can be read from the new external VOL 42' and written into the storage area 910B (S303), and the device configuration information 101 written in the storage area 910B can be written into the shared memory 25B (S304). As a result, the virtual internal VOL 132 (the VOL corresponding to the external VOL 42) existing in the first storage virtualization apparatus 600A is generated in the second storage virtualization apparatus 600B (S305).

A second example of the configuration information IO processing was described above. The second example is considered to be effective when the external VOL managed by the device configuration information 101 in the first example is in use, does not have a system area, or does not have enough available space to store the device configuration information 101, for example.

Next, a third example of the configuration information IO processing will be described.

Figure 12:
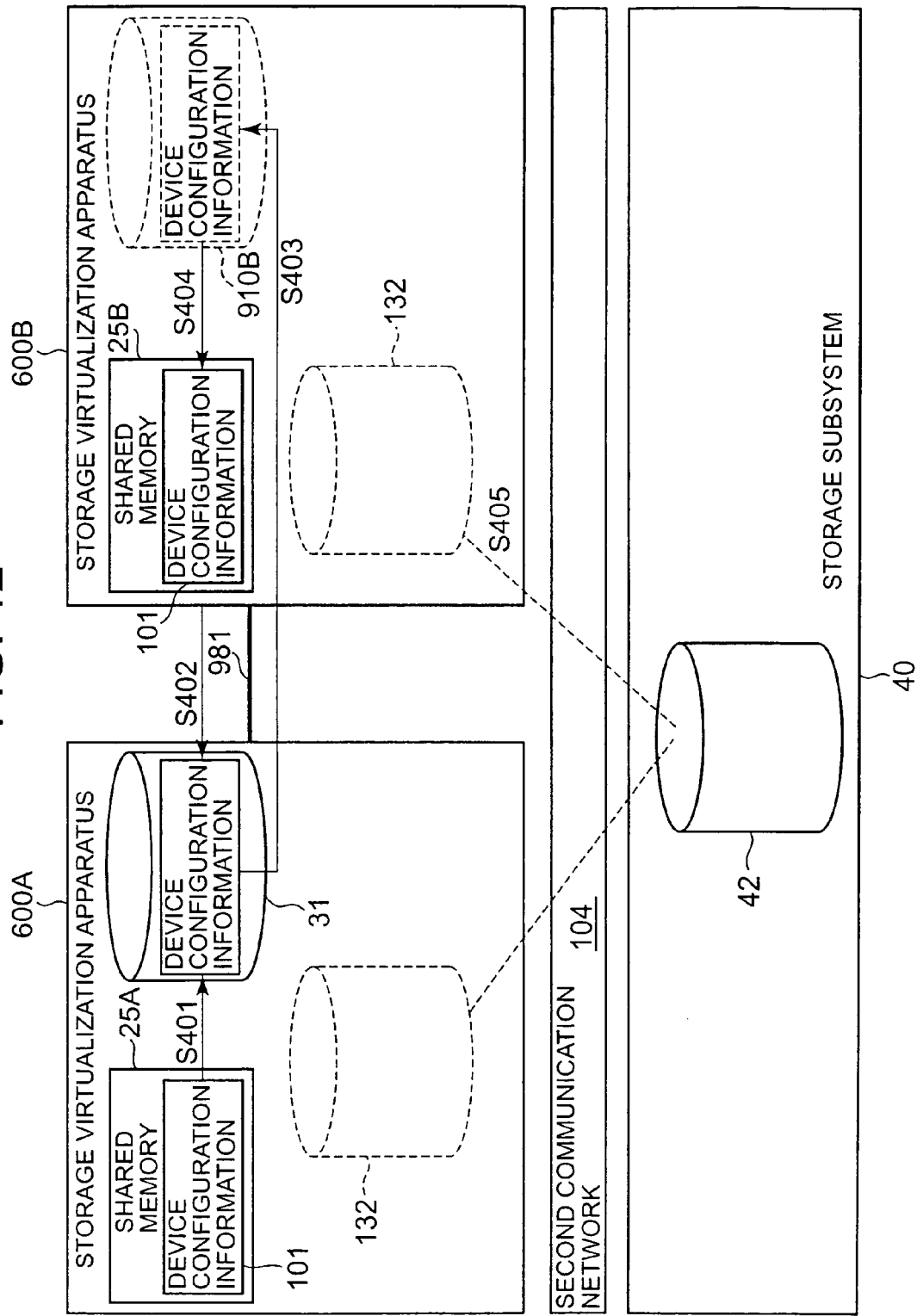
FIG. 12 shows a third example of the configuration information IO processing.

FIG. 12 shows the third example of the configuration information IO processing.

In the third example, the device configuration information 101 is stored in the internal VOL 31 (a logical storage device provided on the internal disk 400) (S401). The first storage virtualization apparatus 600A and second storage virtualization apparatus 600B are connected by a cable 981.

The second storage virtualization apparatus 600B transmits a read command specifying the internal LUN of the internal VOL 31 to the first storage virtualization apparatus 600A through the cable 981 (S402). The first storage virtualization apparatus 600A transmits the device configuration information 101 in the internal VOL 31 corresponding to the specified internal LUN to the second storage virtualization apparatus 600B (S403). The second storage virtualization apparatus 600B writes the received device configuration information 101 into the storage area 910B, and writes the device configuration information in the storage area 910B into the shared memory 25B (S404). As a result, the virtual internal VOL 132 (the VOL corresponding to the external VOL 42) existing in the first storage virtualization apparatus 600A is generated in the second storage virtualization apparatus 600B (S405).

A third example of the configuration information IO processing was described above. The third example is considered to be effective when an external VOL for storing the device configuration information 101 does not exist in the first and second examples, for example.

Next, a fourth example of the configuration information IO processing will be described.

Figure 13:
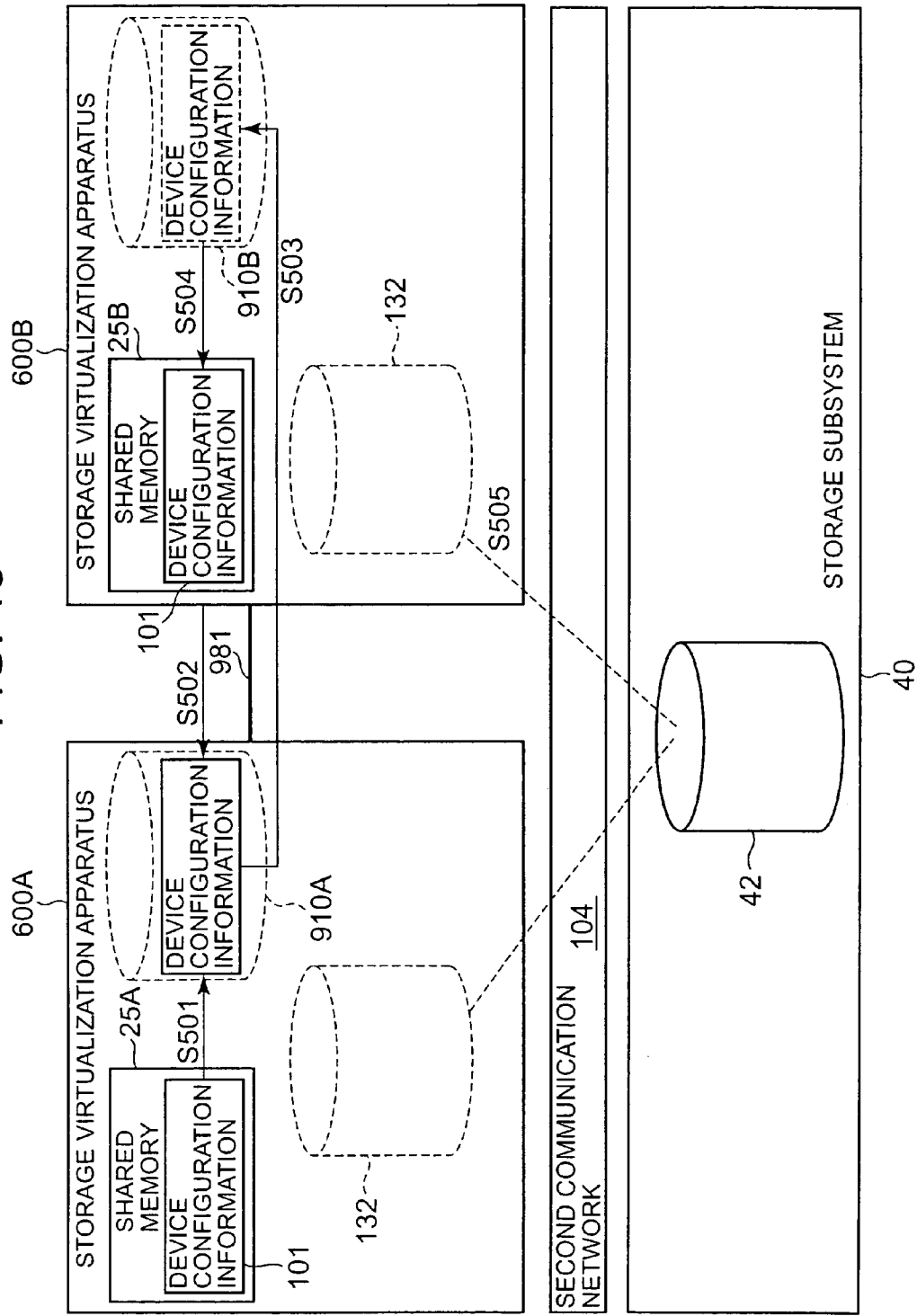
FIG. 13 shows a fourth example of the configuration information IO processing.

FIG. 13 shows the fourth example of the configuration information IO processing.

In the fourth example, the storage area 910A is a different type of virtual VOL to the virtual VOL 102 existing in the VDEV 971. The virtual VOL 910A is a storage space provided on the shared memory 25A or cache memory.

The device configuration information 101 is stored in the virtual VOL 910A (S501). The second storage virtualization apparatus 600B transmits a read command specifying the internal LUN of the virtual VOL 910A to the first storage virtualization apparatus 600A through the cable 981 (S502).

The first storage virtualization apparatus 600A transmits the device configuration information 101 in the virtual VOL 910A corresponding to the specified internal LUN to the second storage virtualization apparatus 600B (S503). The second storage virtualization apparatus 600B writes the received device configuration information 101 into the storage area 910B, and writes the device configuration information 101 in the storage area 910B into the shared memory 25B (S504). As a result, the virtual internal VOL 132 (the VOL corresponding to the external VOL 42) existing in the first storage virtualization apparatus 600A is generated in the second storage virtualization apparatus 600B (S505).

A fourth example of the configuration information IO processing was described above. The fourth example is considered to be effective when an external VOL and an internal VOL for storing the device configuration information 101 do not exist in the first through third examples, for example. Note that in the third and fourth examples, the first storage virtualization apparatus 600A and second storage virtualization apparatus 600B may communicate via the first or second communication network.

The determination as to which configuration information IO processing to perform, from among the processing of the first through fourth examples described above, may be made in advance by a manager, for example, and the first storage virtualization apparatus 600A, for example the CHA 21B thereof, may perform this selection in accordance with the condition of the storage subsystem 40 or its own condition.

Figure 14:
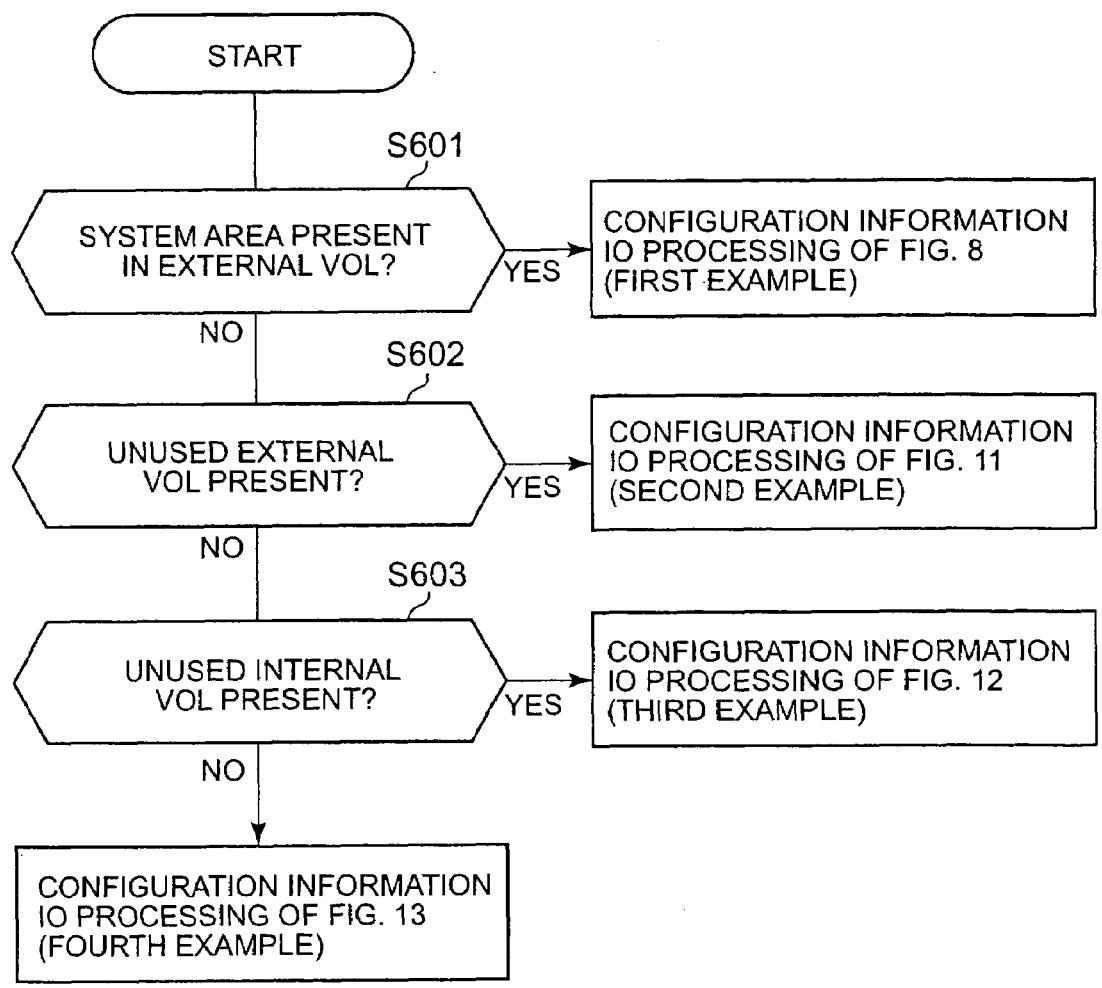
FIG. 14 shows an example of the flow of processing for selecting the configuration information IO processing.

FIG. 14 shows an example of the flow of processing for selecting the configuration information IO processing.

The CHA 21B determines whether or not a system area is provided in the external VOL managed by the device configuration information 101 (S601). When it is determined that the system area exists (YES in S601), the CHA 21B performs the configuration information IO processing shown in FIG. 8 (the configuration information IO processing corresponding to the first example). Note that this determination may be performed by analyzing an information element of the inquiry information relating to the external LUN of the external VOL, for example. Information indicating the presence or absence of the system area, for example, may be provided as the information element.

When the determination of S601 is negative, the CHA 21B determines whether or not an unused external VOL exists (S602). When it is determined that an unused external VOL exists (YES in S602), the CHA 21B performs the configuration information IO processing shown in FIG. 11 (the configuration information IO processing corresponding to the second example). Note that this determination may be performed by analyzing an information element of the inquiry information relating to the external LUN of the external VOL, for example. Information indicating an unused or used status, for example, may be provided as the information element.

When the determination of S602 is negative, the CHA 21B determines whether or not an unused internal VOL 31 exists (S603). When it is determined that an unused internal VOL 31 exists (YES in S603), the CHA 21B performs the configuration information IO processing shown in FIG. 12 (the configuration information IO processing corresponding to the third example). Note that this determination may be performed by referring to a status (for example, "in use", "unused") of each internal VOL 31, recorded in the aforementioned storage management table 223, for example.

When the determination of S603 is negative, the CHA 21B performs the configuration information IO processing shown in FIG. 13 (the configuration information IO processing corresponding to the fourth example).

Of the first through fourth examples, the first example is considered to be most effective, followed by the second example. The reason why the first example is considered to be more effective than the second example is that unlike the second example, a surplus external VOL is not required. The second example is considered to be more effective than the third and fourth examples because the cable for connecting the storage virtualization apparatuses to each other is not required, and even if the first storage virtualization apparatus 600A is removed, another storage virtualization apparatus is capable of obtaining the device configuration information as long as the storage subsystem 40 exists.

According to the above description, the logical device configuration in the first storage virtualization apparatus 600A can be constructed in the second storage virtualization apparatus 600B with substantially no load placed on a person.

Also according to the above description, when the same external VOL is created through mapping in a plurality of storage virtualization apparatuses 600, a virtual VOL created from the storage subsystem 40 can be created by all of the storage virtualization apparatuses 600 in the same size, stripe configuration, RAID level, and so on. As a result, the created virtual VOL achieves data integrity.

Incidentally, the device configuration information 101 can be modified using the following procedure, for example.

Figure 18A:
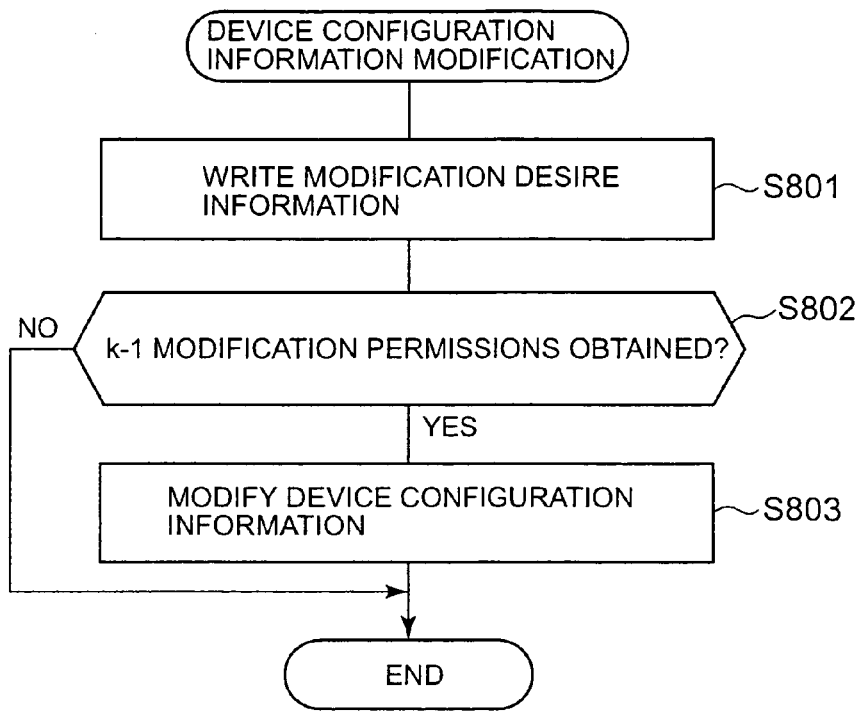
FIG. 18A shows an example of the flow of processing performed by the storage virtualization apparatus 600 to modify the device configuration information.

FIG. 18A shows an example of the flow of processing performed by the storage virtualization apparatus 600 to update the device configuration information.

For example, the CHA 21B transmits a write command for writing information indicating a desire to modify the device configuration information (modification desire information hereafter) to the storage subsystem 40. As a result, the modification desire information is written into a location having the address specified in the write command.

The CHA 21B performs monitoring periodically to check whether or not k−1 modification permissions are recorded in a specific shared storage area of the storage subsystem 40 (S802). The value of k−1 is obtained by subtracting the subject storage virtualization apparatus from the number k of mapped storage virtualization apparatuses.

When k−1 modification permissions are written in the shared storage area (YES in S802), the CHA 21B modifies the device configuration information (S803). Specifically, for example, the CHA 21B removes the unmodified device configuration information and writes the modified device configuration information into the external VOL.

On the other hand, when k−1 modification permissions have not been obtained (NO in S802) and at least one modification denial is written in the shared storage area, the CHA 21B terminates the processing without modifying the device configuration information.

Note that in the processing shown in FIG. 18A, the CHA 21B may refer to the owner information and terminate the processing without performing S801 if the subject storage virtualization apparatus 600 is not the owner. At this time, the CHA 21B may display a message indicating that the device configuration information 101 cannot be modified as the storage virtualization apparatus 600 is not the owner.

Figure 18B:
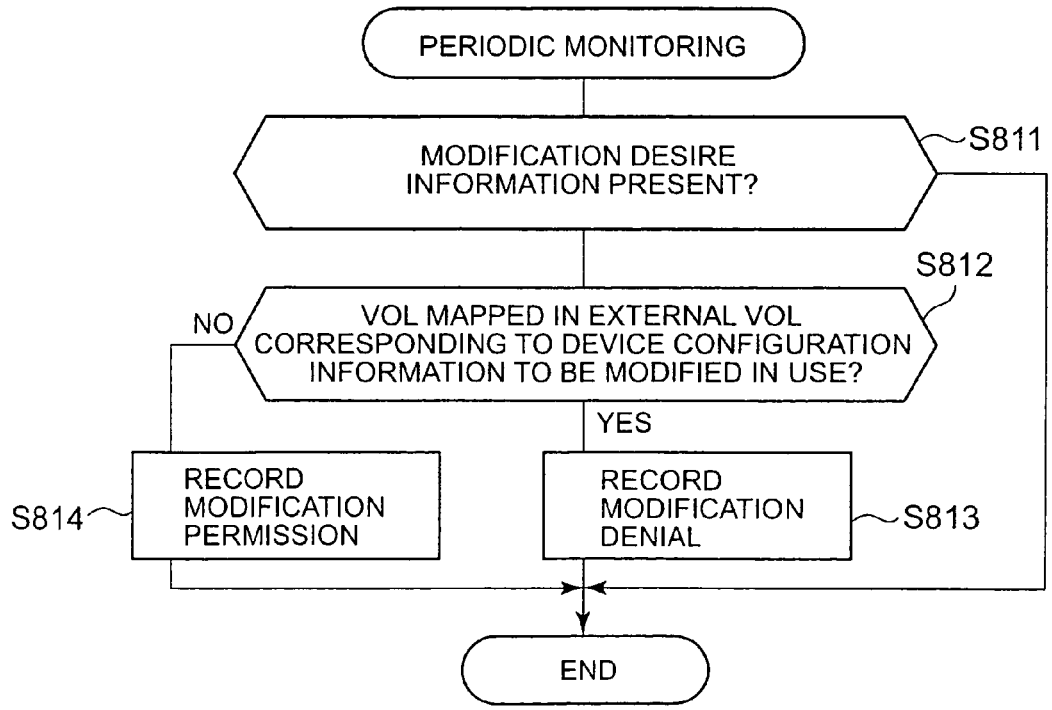
FIG. 18B shows an example of the flow of processing performed by a storage virtualization apparatus 600 other than the storage virtualization apparatus 600 to modify the device configuration information.

FIG. 18B shows an example of the flow of processing performed by a storage virtualization apparatus 600 other than the storage virtualization apparatus 600 to update the device configuration information.

For example, the CHA 21B periodically monitors a specific shared storage area of the storage subsystem 40, and if the modification desire information is written therein (YES in S811), determines whether or not to grant modification permission (S812) For example, if the external VOL 42 managed by the device configuration information to be modified is in use, the CHA 21B registers modification denial in the shared storage area (S813), and if not, the CHA 21B registers modification permission in the shared storage area (S814). A state in which the external VOL 42 is in use corresponds to a state in which an access command has been issued to the external VOL 42 and a response thereto is awaited, a state in which the external VOL 42 forms one half of a VOL pair for performing data copying between an external VOL 42 and another external VOL 42, and so on.

Note that the shared storage area in which modification permissions and modification denials are registered may be provided in the storage subsystem 40 or the storage virtualization apparatus 600.

As shown in the example in FIG. 15, when the logical device configuration of the first storage virtualization apparatus 600A is constructed in the second storage virtualization apparatus 600B, two paths are formed between the host apparatus 10 and the external LUN, one of which passes through the first storage virtualization apparatus 600A and one of which passes through the second storage virtualization apparatus 600B. In other words, an alternative path can be formed.

However, measures must be taken for the host apparatus 10 to recognize the alternative path. The reason that measures must be taken is that when an inquiry command is transmitted specifying the respective internal LUNs (in the example in FIG. 15, both denoted as internal LUN "1") of the first and second storage virtualization apparatuses 600A and 600B, although both of the specified internal LUNs are located on a path passing through the same external LUN, different WWNs (target port WWNs) are included in the inquiry information received in response.

In this embodiment, the second storage virtualization apparatus 600B can be made to recognize the alternative path to the external LUN by controlling the content of the inquiry information of the specified internal LUN. The following two methods, for example, may be employed to realize this recognition. The two methods will be described below in turn.

Figure 16A:
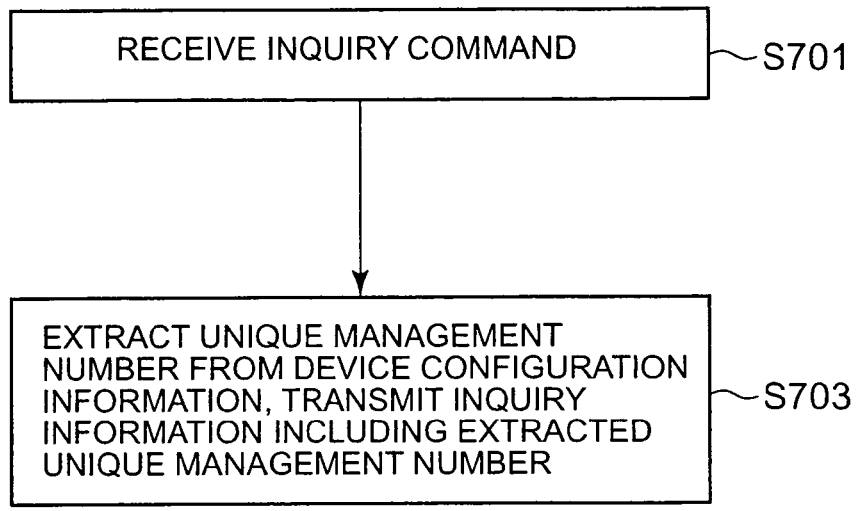
FIG. 16A shows an example of the flow of processing corresponding to a first method for causing the host apparatus 10 to recognize an alternative path to an external LUN.
Figure 16B:
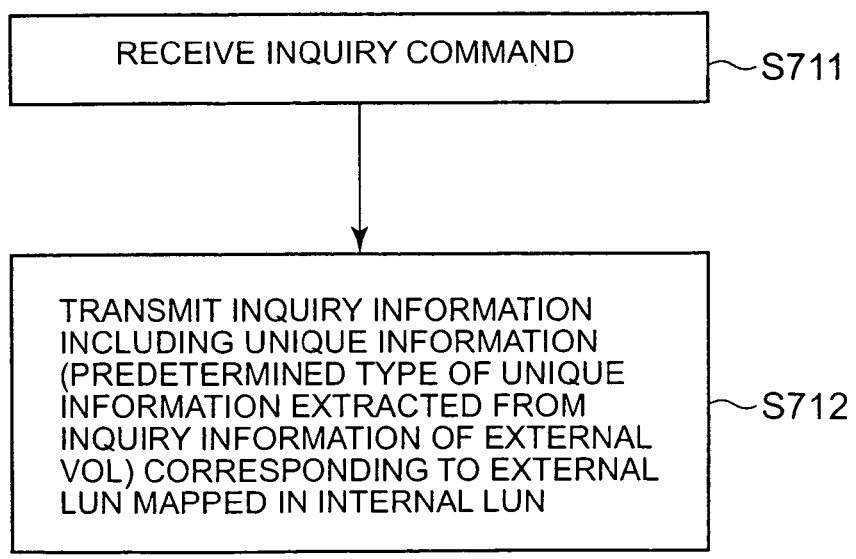
FIG. 16B shows an example of the flow of processing corresponding to a second method for causing the host apparatus 10 to recognize an alternative path to the external LUN.

FIG. 16A shows an example of the flow of processing corresponding to a first method for causing the host apparatus 10 to recognize an alternative path to the external LUN.

When an inquiry command specifying an internal LUN is received from the host apparatus 10 in the second storage virtualization apparatus 600B (S701), the CHA 21D which receives the command from the host apparatus 10 extracts the unique management number from the volume configuration information 101 and transmits the inquiry information included in the unique management number (S702). Note that the CHA 21D may determine whether or not the specified internal LUN is an internal LUN included in the device configuration information 101 stored in the shared memory 25B and perform S702 when an affirmative determination result is obtained.

The host apparatus 10 (for example, path management software not shown in the drawing) stores the unique management number included in the inquiry information received from the first storage virtualization apparatus 600A in a predetermined storage area. The host apparatus 10 then compares the unique management number included in inquiry information received subsequently from the second storage virtualization apparatus 600B with the unique management number stored in the predetermined storage area, and if a match is obtained, the host apparatus 10 is able to recognize the path which passes through the LUN specified in S701 as an alternative path.

FIG. 1 GB shows an example of the flow of processing corresponding to a second method for causing the host apparatus 10 to recognize an alternative path to the external LUN.

Upon reception of an inquiry command from the host apparatus 10 specifying an internal LUN (S711), the CHA 21D of the second storage virtualization apparatus 600B transmits inquiry information including unique information to the external LUN which corresponds to the internal LUN (S712). Note that the CHA 21D may determine whether or not the specified internal LUN is an internal LUN included in the device configuration information 101 stored in the shared memory 25B and perform S712 when an affirmative determination result is obtained. As the aforementioned unique information, a unique information element extracted from the external LUN inquiry information, for example, may be used.

The host apparatus 10 (for example, path management software not shown in the drawing) stores the unique information included in the inquiry information received from the first storage virtualization apparatus 600A in a predetermined storage area. The host apparatus 10 then compares the unique information included in inquiry information received subsequently from the second storage virtualization apparatus 600B with the unique management number stored in the predetermined storage area, and if a match is obtained, the host apparatus 10 is able to recognize the path which passes through the LUN specified in S711 as an alternative path.

In both the first and second methods described above, the storage virtualization apparatuses 600A, 600B do not require identifiers. The host apparatus 10 recognizes the internal LUN in the storage virtualization apparatuses 600A, 600B, but does not recognize the storage virtualization apparatus in which the internal LUN exists.

Once the host apparatus 10 has recognized the alternative path, the path can be switched appropriately during access to the same external LUN.

Figure 17A:
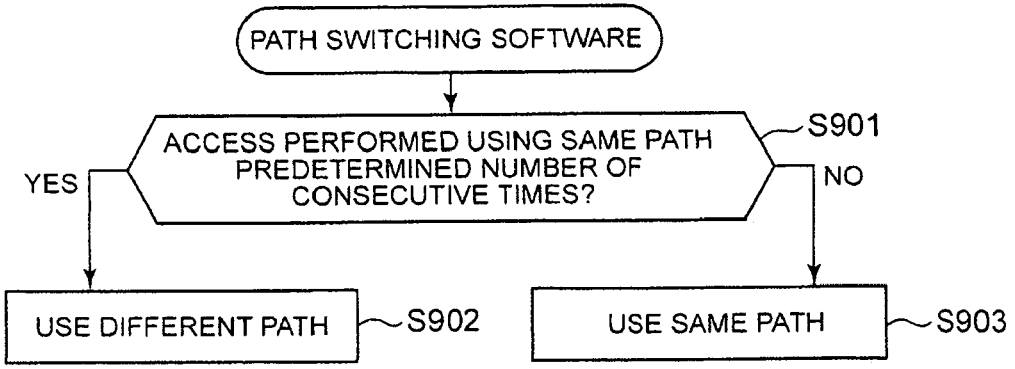
FIG. 17A shows an example of first path switching processing.

FIG. 17A shows an example of first path switching processing.

Path switching software serving as one of the computer programs executed by the CPU is installed in the host apparatus 10. The path switching software has a function for counting the number of continuous uses of a path, and when an internal LUN corresponding to the same external LUN has been accessed using the same path a predetermined number of consecutive times (YES in S901), a different internal LUN corresponding to the same external LUN is accessed using an alternative path (S902). When S901 is negative (NO in S901), the path switching software performs access using the same path (S903).

Figure 17B:
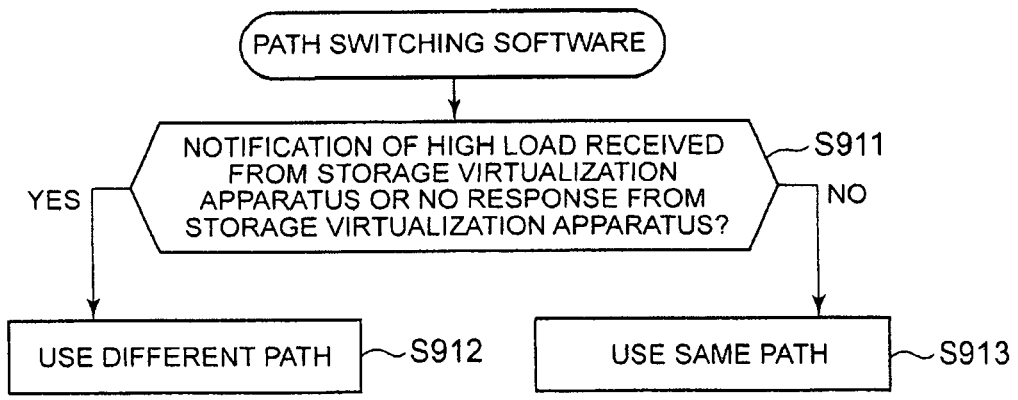
FIG. 17B shows an example of second path switching processing.

FIG. 17B shows an example of second path switching processing.

Upon reception of notification from the storage virtualization apparatus 600 forming the used path that the load thereon is high, or when no response is received from the storage virtualization apparatus 600 (YES in S911), the path switching software performs access using an alternative path (S912). When S911 is negative (NO in S911), the path switching software performs access using the same path (S913).

Note that in this example, each storage virtualization apparatus 600 is capable of monitoring the load on each path (for example, the load on each target port) and informing the host apparatus 10 that the load is high when the load exceeds a predetermined value. Alternatively, each storage virtualization apparatus 600 may stop responding to the host apparatus 10 when the path load exceeds a predetermined value.

Figure 17C:
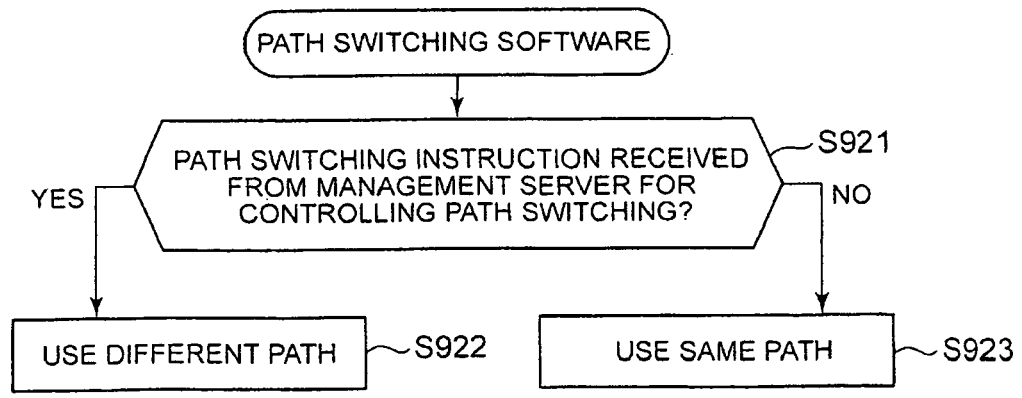
FIG. 17C shows an example of third path switching processing.

FIG. 17C shows an example of third path switching processing.

In the computer system according to this embodiment, a management server for monitoring the path load (for example, the data amount per unit time) between the host apparatus 10 and each storage virtualization apparatus 600 may be provided in the first communication network 105, for example. The management server is capable of learning the load on each path by collecting the load on each target port from each storage virtualization apparatus 600. When a path having a load which exceeds a predetermined load exists, the management server can transmit a path switching instruction to employ an alternative path to the same external LUN to the host apparatus 10.

Upon reception of the path switching instruction from the management server (YES in S921), the path switching software switches the used path (S922), and when a path switching instruction is not received, the path switching software performs access without switching the path (S923).

Examples of path switching methods were described above, but the present invention is not limited to these examples, and other methods may be employed. For example, the method disclosed in Japanese Unexamined Patent Application Publication 2006-40026 (U.S. application Ser. No. 10/975,447, US Publication No. US2006/0026346A1) may be employed as a path switching method. Path switching may also be applied to an alternative path formed between the storage virtualization apparatus 600 and the external LUN of the storage subsystem.

An embodiment of the present invention was described above, but this embodiment is merely an example used to describe the present invention, and the scope of the present invention is not limited to this embodiment. The present invention may be implemented in various other embodiments. For example, in the embodiment described above, communication between the storage virtualization apparatus 600 and storage subsystem 40 may be performed according to the iSCSI protocol. In this case, a channel adapter having a communication port allotted an iSCSI name (a unique ID in the iSCSI protocol) may be provided instead of the CHAs of the storage virtualization apparatus 600 and storage subsystem 40, for example. Also in this case, iSCSI names, for example, may be exchanged between the storage virtualization apparatus 600 and storage subsystem 40 instead of the WWNs of the embodiment described above. Further, the CHA 21A which communicates with the host apparatus 10 may be a CHA functioning as an NAS. The computer system according to the above embodiment may also be applied to a mainframe system. Further, the device configuration information 101 may be stored in the shared storage area (for example, the aforementioned external VOL 42 or new external VOL 42') in advance such that the first storage virtualization apparatus 600A as well as the second storage virtualization apparatus 600B can read the device configuration information 101 from the shared storage area and set the device configuration information 101 in the shared memory 25A.

What is claimed is:

1. A storage virtualization system comprising:
a plurality of storage virtualization apparatuses coupled to an upper order apparatus and a storage subsystem; and
a shared storage area shared by said plurality of storage virtualization apparatuses, said shared storage area storing device configuration information expressing a logical device configuration in said plurality of storage virtualization apparatuses,
wherein said logical device configuration is a relationship between one or more external storage devices serving as a storage device of said storage subsystem and one or more internal storage devices which serves as logical storage area in said plurality of storage virtualization apparatuses,
wherein each of said plurality of storage virtualization apparatuses comprises:
a configuration information storage area for storing said device configuration information; and
a controller for receiving a first access command specifying an internal storage device from said upper order apparatus, generating a second access command for accessing an external storage device associated with said specified internal storage device based on said device configuration information stored in said configuration information storage area, and transmitting said second access command to said storage subsystem,
wherein said controller of a newly coupled storage virtualization apparatus from among said plurality of storage virtualization apparatuses, which is newly coupled to said upper order apparatus and said storage subsystem, reads said device configuration information from said shared storage area and writes said read device configuration information into said configuration information storage area,
wherein a plurality of internal storage devices in said plurality of storage virtualization apparatuses are associated with a single external storage device provided by said storage subsystem,
wherein said controller of one of said plurality of storage virtualization apparatuses writes modification desire information, which is information expressing a desire to modify said device configuration information, in said shared storage area,
wherein when said external storage device mapped in said device configuration information is in use, another controller in another of said plurality of storage virtualization apparatuses writes modification denial information denying modification into said shared storage area, and when said external storage device mapped in said device configuration information is not in use, said other controller in said other storage virtualization apparatus writes modification permission information permitting modification into said shared storage area, and
wherein when said modification denial information is written in said shared storage area, said controller does not modify said device configuration information, and when said modification permission information is written in said shared storage area and said modification denial information is not written in said shared storage area, said controller modifies said device configuration information.

2. The storage virtualization system according to claim 1,
wherein said plurality of storage virtualization apparatuses comprise a first storage virtualization apparatus, and a second storage virtualization apparatus which is coupled to said upper order apparatus and said storage subsystem after said first storage virtualization apparatus,
wherein said first storage virtualization apparatus comprises a first configuration information storage area and a first controller, whereby said device configuration information expressing said logical device configuration in said first storage virtualization apparatus is stored in said first configuration information storage area and said first controller reads said device configuration information from said first configuration information storage area and writes said device configuration information into said shared storage area, and
wherein said second storage virtualization apparatus comprises a second configuration information storage area and a second controller, whereby said second controller reads said device configuration information from said shared storage area and writes said device configuration information into said second configuration information storage area.

3. The storage virtualization system according to claim 1, wherein said shared storage area is a system area of said external storage device mapped in said device configuration information, and
wherein said system area is a storage area that can be accessed by each of said plurality of storage virtualization apparatuses but is not accessed by said second access command issued based on said first access command from said upper order apparatus.

4. The storage virtualization system according to claim 1, wherein said shared storage area is provided in a different external storage device to said external storage device mapped in said device configuration information.

5. The storage virtualization system according to claim 2, wherein, when said external storage device mapped in said device configuration information is not provided with a system area, said first controller sets said shared storage area in a different external storage device to said external storage device mapped in said device configuration information, and when said external storage device mapped in said device configuration information is provided with said system area, said first controller sets said shared storage area in said system area of said external storage device mapped in said device configuration information, and
wherein said system area is a storage area that can be accessed by each of said plurality of storage virtualization apparatuses but is not accessed by said second access command issued based on said first access command from said upper order apparatus.

6. The storage virtualization system according to claim 1, wherein one of said plurality of storage virtualization apparatuses comprises a different logical storage device to said logical storage device, and
wherein said shared storage area is provided in said different logical storage device.

7. The storage virtualization system according to claim 2, wherein, when an external storage device that can be used as said shared storage area is not provided in said storage subsystem, said first controller sets said shared storage area as said different logical storage device, and when an external storage device that can be used as said shared storage area is provided in said storage subsystem, said first controller sets said shared storage area in said external storage device.

8. The storage virtualization system according to claim 1, wherein said device configuration information includes, in addition to said information expressing said logical device configuration, a code sequence indicating that said device configuration information is said device configuration information,
wherein said code sequence exists in a predetermined location of said device configuration information, and
wherein said controller of said newly coupled storage virtualization apparatus issues a read command specifying said location of said code sequence to said shared storage area, and when data read in accordance with said read command are said code sequence, said controller of said newly coupled storage virtualization apparatus issues a read command for reading the remainder of said device configuration information to said shared storage area.

9. The storage virtualization system according to claim 8, wherein said storage subsystem comprises a communication port serving as a target of each of said plurality of storage virtualization apparatuses, a plurality of devices including said external storage device, and a plurality of logical unit numbers (LUNs) corresponding respectively to said plurality of devices,
wherein one or more of said plurality of LUNs belong to each communication port in said storage subsystem,
wherein said shared storage area is said external storage device, and
wherein said controller of said newly coupled storage virtualization apparatus recognizes said target communication port upon connection to a network to which said storage subsystem is coupled, issues a first inquiry command to said target communication port, receives notification of said one or more LUNs belonging to said target communication port in response to said first inquiry command, issues a second inquiry command to each of said one or more LUNs, receives attribute data expressing an attribute relating to said specified LUNs in response to said second inquiry command, and when said attribute data are data indicating said external storage device, issues said read command specifying said location of said code sequence to said shared storage area.

10. The storage virtualization system according to claim 1, wherein said device configuration information includes a level of priority for each of said plurality of storage virtualization apparatuses, and
wherein said controller does not write said modification desire information into said shared storage area when said level of priority of a storage virtualization apparatus is equal to or lower than a predetermined value.

11. The storage virtualization system according to claim 1, wherein a number of mapped storage virtualization apparatuses (=k, k being an integer of 2 or more) is recorded in said device configuration information, and
wherein said controller modifies said device configuration information when said modification permission information is written into said shared storage area k−1 times.

12. The storage virtualization system according to claim 1, wherein, upon reception of a specific inquiry command from said upper order apparatus, said controller of said newly coupled storage virtualization apparatus transmits inquiry response information including unique information relating to said external storage device mapped in said device configuration information that is stored in said configuration information storage area.

13. The storage virtualization system according to claim 12,
wherein said device configuration information includes a unique ID constituted by a code sequence which is unique to said device configuration information, and
wherein said controller extracts said unique ID from said device configuration information and transmits said inquiry response information including said unique ID.

14. The storage virtualization system according to claim 12, wherein said controller extracts information unique to said external storage device mapped in said device configuration information from said inquiry response information received after issuing said specific inquiry command to said external storage device, and upon reception of a specific inquiry command from said upper order apparatus, transmits said inquiry response information including said extracted unique information.

15. The storage virtualization system according to claim 12, wherein said upper order apparatus comprises:
an inquiry unit for transmitting said specific inquiry command to each internal storage device;
an alternative path recognition unit which, when identical unique information is included in said inquiry response information received in response to each of said specific inquiry commands, recognizes that each path that receives said inquiry response information is an alternative path coupled to the same storage device; and a path switching unit for switching said alternative path to be used from among said plurality of recognized alternative paths.

16. The storage virtualization system according to claim 15, wherein said path switching unit switches said alternative path in any of following cases (A) through (D):

(A) when the same alternative path has been used a predetermined number of consecutive times;

(B) when a notification indicating that a load of said used alternative path has exceeded a predetermined value is received from a storage virtualization apparatus through which said alternative path passes;

(C) when no response is received from said storage virtualization apparatus through which said used alternative path passes; and (D) when an instruction to switch said used alternative path is received from a server for managing said plurality of alternative paths between said plurality of storage virtualization apparatuses and said upper order apparatus.

17. The storage virtualization system according to claim 1, wherein said shared storage area is provided in said external storage device, wherein said device configuration information includes, in addition to said information expressing said logical device configuration, a code sequence indicating that said device configuration information is said device configuration information, wherein said code sequence exists in a predetermined location of said device configuration information, wherein said plurality of storage virtualization apparatuses comprise a first storage virtualization apparatus, and a second storage virtualization apparatus which is coupled to said upper order apparatus and said storage subsystem after said first storage virtualization apparatus, wherein said first storage virtualization apparatus comprises a first configuration information storage area and a first controller, whereby said device configuration information expressing said logical device configuration in said first storage virtualization apparatus is stored in said first configuration information storage area and said first controller reads said device configuration information from said first configuration information storage area and writes said device configuration information into said shared storage area, wherein said second storage virtualization apparatus comprises a second configuration information storage area and a second controller, said second controller issues a read command specifying said location of said code sequence to said shared storage area, and when data read in accordance with said read command are said code sequence, said second controller issues a read command for reading the remainder of said device configuration information to said shared storage area, writes said device configuration information including said read information and said code sequence into said second configuration information storage area, and upon reception of a specific inquiry command from said upper order apparatus, transmits inquiry response information including unique information relating to said external storage device mapped in said device configuration information that is stored in said second configuration information storage area, and wherein said upper order apparatus comprises an inquiry unit for transmitting said, specific inquiry command to each internal storage device, and an alternative path recognition unit which, when identical unique information is included in said inquiry response information received in response to each of said specific inquiry commands, recognizes that each path that receives said inquiry response information is an alternative path coupled to the same storage device.

18. A storage virtualization method, comprising:

storing, in a shared storage area of a plurality of storage virtualization apparatuses coupled to an upper order apparatus and a storage subsystem, store device configuration information expressing a logical device configuration in said plurality of storage virtualization apparatuses, wherein said logical device configuration is a relationship between an external storage device serving as a storage device of said storage subsystem, a virtual device serving as a virtualized storage space of a storage resource provided by one or a plurality of said external storage devices, and one or more logical storage devices constituting an internal storage device serving as a storage device in said plurality of storage virtualization, apparatuses; and reading, by a storage virtualization apparatus from among said plurality of storage virtualization apparatuses which is newly coupled to said upper order apparatus and said storage subsystem, said device configuration information from said shared storage area;

writing, by the storage virtualization apparatus from among said plurality of storage virtualization apparatuses which is newly coupled to said upper order apparatus and said storage subsystem, writes said read device configuration information into a configuration information storage area of said plurality of storage virtualization apparatus, wherein a plurality of internal storage devices in said plurality of storage virtualization apparatuses are associated with a single external storage device provided by said storage subsystem, wherein a controller of one of said plurality of storage virtualization apparatuses writes modification desire information, which is information expressing a desire to modify said device configuration information, in said shared storage area, wherein when said external storage device mapped in said device configuration information is in use, another controller in another of said plurality of storage virtualization apparatuses writes modification denial information denying modification into said shared storage area, and when said external storage device mapped in said device configuration information is not in use, said other controller in said other storage virtualization apparatus writes modification permission information permitting modification into said shared storage area, and wherein when said modification denial information is written in said shared storage area, said controller does not modify said device configuration information, and when said modification permission information is written in said shared storage area and said modification denial information is not written in said shared storage area, said controller modifies said device configuration information.

* * * * *